(12) United States Patent
Heinecke et al.

(10) Patent No.: US 12,541,365 B2
(45) Date of Patent: Feb. 3, 2026

(54) SYSTEMS AND METHODS FOR PERFORMING INSTRUCTIONS TO CONVERT TO 16-BIT FLOATING-POINT FORMAT

(71) Applicant: Intel Corporation, Santa Clara, CA (US)

(72) Inventors: Alexander F. Heinecke, San Jose, CA (US); Robert Valentine, Kiryat Tivon (IL); Mark J. Charney, Lexington, MA (US); Raanan Sade, Portland, OR (US); Menachem Adelman, Modi'in (IL); Zeev Sperber, Zichron Yackov (IL); Amit Gradstein, Binyamina (IL); Simon Rubanovich, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/925,482

(22) Filed: Oct. 24, 2024

(65) Prior Publication Data

US 2025/0117217 A1 Apr. 10, 2025

Related U.S. Application Data

(63) Continuation of application No. 17/851,468, filed on Jun. 28, 2022, now Pat. No. 12,131,154, which is a
(Continued)

(51) Int. Cl.
*G06F 9/30* (2018.01)
*G06F 9/38* (2018.01)

(52) U.S. Cl.
CPC ...... *G06F 9/30025* (2013.01); *G06F 9/30014* (2013.01); *G06F 9/30018* (2013.01);
(Continued)

(58) Field of Classification Search
CPC .................. G06F 9/30025; G06F 9/30038
See application file for complete search history.

(56) References Cited

U.S. PATENT DOCUMENTS

| 5,995,122 A | 11/1999 | Hsieh et al. |
| 8,412,761 B2 | 4/2013 | Yoshida |

(Continued)

FOREIGN PATENT DOCUMENTS

| CN | 104145245 A | 11/2014 |
| CN | 106030510 A | 10/2016 |

(Continued)

OTHER PUBLICATIONS

AMD, "AMD64 Technology AMD64 Architecture Programmer's Manual vol. 1: Application Programming", Rev. 3.20, May 2013, 386 pages.
(Continued)

*Primary Examiner* — Michael J Metzger
(74) *Attorney, Agent, or Firm* — NICHOLSON DE VOS WEBSTER & ELLIOTT LLP

(57) ABSTRACT

Disclosed embodiments relate to systems and methods for performing instructions to convert to 16-bit floating-point format. In one example, a processor includes fetch circuitry to fetch an instruction having fields to specify an opcode and locations of a first source vector comprising N single-precision elements, and a destination vector comprising at least N 16-bit floating-point elements, the opcode to indicate execution circuitry is to convert each of the elements of the specified source vector to 16-bit floating-point, the conversion to include truncation and rounding, as necessary, and to store each converted element into a corresponding location of the specified destination vector, decode circuitry to
(Continued)

decode the fetched instruction, and execution circuitry to respond to the decoded instruction as specified by the opcode.

20 Claims, 24 Drawing Sheets

Related U.S. Application Data continuation of application No. 16/186,384, filed on Nov. 9, 2018, now Pat. No. 11,372,643.

(52) U.S. Cl.
CPC ...... *G06F 9/30036* (2013.01); *G06F 9/30038* (2023.08); *G06F 9/30105* (2013.01); *G06F 9/3802* (2013.01); *G06F 9/3818* (2013.01); *G06F 9/384* (2013.01); *G06F 9/3887* (2013.01); *G06F 9/3888* (2023.08)

(56) References Cited

U.S. PATENT DOCUMENTS

| | | | |
|---|---|---|---|
| 8,667,250 | B2 | 3/2014 | Sprangle et al. |
| 10,073,695 | B2* | 9/2018 | Anderson ........... G06F 9/30036 |
| 10,705,839 | B2 | 7/2020 | Valentine et al. |
| 2002/0184282 | A1 | 12/2002 | Yuval et al. |
| 2004/0268094 | A1 | 12/2004 | Abdallah et al. |
| 2008/0077779 | A1 | 3/2008 | Zohar et al. |
| 2012/0011348 | A1 | 1/2012 | Eichenberger et al. |
| 2013/0073838 | A1 | 3/2013 | Gschwind et al. |
| 2013/0290685 | A1 | 10/2013 | Corbal et al. |
| 2014/0149724 | A1* | 5/2014 | Valentine ............ G06F 9/30149 712/226 |
| 2014/0195580 | A1 | 7/2014 | Anderson et al. |
| 2014/0208080 | A1 | 7/2014 | Ould-Ahmed-Vall et al. |
| 2015/0039854 | A1 | 2/2015 | Wick |
| 2015/0088946 | A1 | 3/2015 | Anderson et al. |
| 2015/0286482 | A1 | 10/2015 | Espasa et al. |
| 2017/0061279 | A1 | 3/2017 | Kloss et al. |
| 2017/0068516 | A1 | 3/2017 | Anderson et al. |
| 2017/0177350 | A1 | 6/2017 | Ould-Ahmed-Vall |
| 2017/0286109 | A1 | 10/2017 | Jha |
| 2018/0081685 | A1 | 3/2018 | Bhuiyan et al. |
| 2018/0121199 | A1 | 5/2018 | Uliel et al. |
| 2018/0157464 | A1 | 6/2018 | Lutz et al. |
| 2018/0189065 | A1 | 7/2018 | Raman et al. |
| 2018/0293078 | A1 | 10/2018 | Gabrielli et al. |
| 2018/0321937 | A1 | 11/2018 | Brown et al. |
| 2019/0042544 | A1 | 2/2019 | Kashyap et al. |
| 2019/0354568 | A1 | 11/2019 | Lindberg et al. |

FOREIGN PATENT DOCUMENTS

| | | |
|---|---|---|
| CN | 108369573 A | 8/2018 |
| CN | 108647044 A | 10/2018 |
| WO | 2013/101233 A1 | 7/2013 |
| WO | 2015/147895 A1 | 10/2015 |
| WO | 2017/105715 A1 | 6/2017 |

OTHER PUBLICATIONS

Amd64, "Advanced Micro Devices AMD64 Technology AMD64 Architecture Programmer's Manual vol. 4: 128-Bit and 256-Bit Media Instructions", Revision 3.17, Advanced Micro Devices, May 2013, 144 pages.
Bagnara et al., "Symbolic Path-Oriented Test Data Generation for Floating-Point Programs", 2013 IEEE Sixth International Conference on Software Testing, Verification and Validation, IEEE, 2013, 10 pages.
Basu, S. K., "Parallel and Distributed Computing: Architectures and Algorithms", PHI Learning, Jul. 30, 2016, pp. 36-37.
Communication pursuant to Article 94(3) EPC, EP App. No. 20216494. 3, Sep. 21, 2021, 10 pages.
Decision to Grant, EP App. No. 20216494.3, Nov. 7, 2024, 2 pages.
Decision to Grant, EP App. No. 21169540.8, Dec. 14, 2023, 2 pages.
European Communication pursuant to Article 94(3) EPC, EP App. No. 20216494.3, Apr. 7, 2021, 9 pages.
European Communication pursuant to Article 94(3) EPC, EP App. No. 20216494.3, Jul. 18, 2022, 9 pages.
European Search Report and Search Opinion , EP App. No. 20207968. 7, Feb. 10, 2021, 12 pages.
European Search Report and Search Opinion, EP App. No. 19201879. 4, Jun. 24, 2020, 10 pages.
European Search Report and Search Opinion, EP App. No. 21169540. 8, Jul. 27, 2021, 14 pages.
European Search Report, EP App. No. 20216494.3, Mar. 24, 2021, 5 pages.
Final Office Action, U.S. Appl. No. 16/186,384, Sep. 15, 2020, 9 pages.
Final Office Action, U.S. Appl. No. 17/851,468, Dec. 11, 2023, 10 pages.
IEEE, "IEEE Standard for Floating-Point Arithmetic", IEEE Computer Society, IEEE Std 754(trademark)-2008 (Revision of IEEE Std 754-1985), Aug. 29, 2008, 70 pages.
Intel Corporation, "Intel® Architecture Instruction Set Extensions Programming Reference", Order No. 319433-012, Feb. 2012, 596 pages.
Intel Corporation, "Intel® Architecture Instruction Set Extensions Programming Reference", Order No. 319433-023, Aug. 2015, 12 pages.
Intel, "BFLOAT16—Hardware Numerics Definition", White Paper, Revision 1.0, Document No. 338302-001US, Nov. 2018, 7 pages.
Intel, "Intel® 64 and IA-32 Architectures Software Developer's Manual", vol. 1: Basic Architecture, Order No. 253665-066US, Mar. 2018, 4 pages (5-27, 14-18, 14-19).
Intention to grant , EP App. No. 21169540.8, Aug. 21, 2023, 07 pages.
Intention to Grant, EP App. No. 20216494.3, Jul. 3, 2024, 6 pages.
Kolli et al., "High-Performance Transactions for Persistent Memories", ACM, 2016, 13 Pages.
Koster et al., "Flexpoint: An Adaptive Numerical Format for Efficient Training of Deep Neural Networks", NIPS'17: Proceedings of the 31st International Conference on Neural Information Processing Systems, Dec. 2017, pp. 1-10.
Lacassagne et al., "16-bit floating point instructions for embedded multimedia applications", Proceedings of the Seventh International Workshop on Computer Architecture for Machine Perception (CAMP'05), IEEE, 2005, 6 pages.
Non-Final Office Action, U.S. Appl. No. 16/186,384, Apr. 9, 2020, 9 pages.
Non-Final Office Action, U.S. Appl. No. 16/186,384, May 21, 2021, 10 pages.
Non-Final Office Action, U.S. Appl. No. 17/851,468, May 5, 2023, 10 pages.
Notice of Allowance, CN App. No. 202011497335.0, Feb. 29, 2024, 08 pages (04 pages of English Translation and 04 pages of Original Document).
Notice of Allowance, CN App. No. 202110484218.9, Jun. 25, 2024, 11 pages (05 page of English Translation and 06 pages of Original Document).
Notice of Allowance, U.S. App. No. 16/186,384, Feb. 2, 2022, 8 pages.
Notice of Allowance, U.S. Appl. No. 16/186,384, Jun. 1, 2022, 3 pages.
Notice of Allowance, U.S. Appl. No. 16/186,384, Mar. 17, 2022, 3 pages.
Notice of Allowance, U.S. Appl. No. 17/133,078, Mar. 22, 2021, 8 pages.
Notice of Allowance, U.S. Appl. No. 17/133,255, Mar. 22, 2021, 8 pages.
Notice of Allowance, U.S. Appl. No. 17/851,468, Jul. 11, 2024, 7 pages.
Notice of Allowance, U.S. Appl. No. 17/851,468, Sep. 13, 2024, 2 pages.

(56) References Cited

OTHER PUBLICATIONS

NVIDIA, "NVIDIA Tesla P100", Whitepaper, WP-08019-001_v01. 1, pp. 1-45.
NVIDIA, "Parallel Thread Execution ISA", Application Guide, v6.3, Oct. 2018, 87 pages.
Office Action , EP App. No. 19201879.4, Jun. 7, 2024, 05 pages.
Office Action , EP App. No. 19201879.4, Sep. 5, 2023, 08 pages.
Office Action, CN App. No. 202011497335.0, Sep. 26, 2023, 3 pages.
Office Action, CN App. No. 202110484218.9, Jan. 21, 2024, 05 pages of Original Document Only.
Office Action, EP App. No. 19201879.4, Apr. 21, 2022, 9 pages.
Office Action, EP App. No. 19201879.4, Feb. 9, 2021, 8 pages.
Office Action, EP App. No. 20207968.7, Aug. 22, 2023, 10 pages.
Office Action, EP App. No. 20207968.7, Dec. 6, 2021, 8 pages.
Office Action, EP App. No. 20207968.7, Jul. 5, 2023, 3 pages.
Office Action, EP App. No. 20207968.7, Jun. 23, 2022, 8 pages.
Office Action, EP App. No. 20207968.7, Nov. 13, 2023, 7 pages.
Office Action, EP App. No. 20216494.3, Apr. 18, 2023, 9 pages.
Office Action, EP App. No. 20216494.3, Feb. 2, 2024 17 pages.
Office Action, EP App. No. 20216494.3, Mar. 2, 2022, 7 pages.
Office Action, EP App. No. 20216494.3, Nov. 22, 2022, 10 pages.
Office Action, EP App. No. 21169540.8, Apr. 13, 2022, 5 pages.
Office Action, EP App. No. 21169540.8, Nov. 22, 2022, 11 pages.
Second Office Action, CN App. No. 202011497335.0, Jan. 4, 2024, 03 pages of Original Document Only.
Stephens et al., The ARM Scalable Vector Extension, IEEE Micro, vol. 37, No. 2, Mar.-Apr. 2017, 8 pages.
Tagliavini et al., "A Transprecision Floating-Point Platform for Ultra-Low Power Computing", EDAA, 2018, 6 pages.
Tagliavini et al., "A Transprecision Floating-Point Platform for Ultra-Low Power Computing", EDAA, Design, Automation And Test in Europe, 2018, pp. 1051-1056.
Waterman et al., "The RISC-V Instruction Set Manual, vol. I: Base User-Level ISA", Electrical Engineering and Computer Sciences, Technical Report No. UCB/EECS-2011-62, May 13, 2011, 34 pages.
Wikimedia Foundation, Inc., "BFloat16 Floating-Point Format", available online at <https://en.wikipedia.org/w/index.php?title=Bfloat16_floating%ADpoint_format&oldid=856298357>, Aug. 24, 2018, 3 pages.
Wikimedia Foundation, Inc., "Half-Precision Floating-Point Format", available online at <https://en.wikipedia.org/w/index.php?title=Half-precision_floating%ADpoint_format&oldid=849804123>, Jul. 11, 2018, 6 pages.
Wikipedia, "Bfloat16 Floating-Point Format", Available Online at <https://en.wikipedia.org/w/index.php?title=Bfloat16_floating-point_format&oldid=862115029>, Oct. 2, 2018, 5 pages.
Wikipedia, "Half-Precision Floating-Point Format", Available Online at <https://en.wikipedia.org/w/index.php?title=Half-precision_floating-point_format&oldid=866403892>, Oct. 30, 2018, 5 pages.
Extended European Search Report, EP App. No. 25170319.5, Jul. 18, 2025, 12 pages.

* cited by examiner

Instruction 301

| Opcode<br>VCVTNEPS2BF16*<br>302 | Destination<br>Location<br>(reg / mem)<br>304 | First Source<br>Location<br>(reg / tile / mem)<br>306 | {k}<br>308 | {Z}<br>310 |

Pseudocode
315

```
VCVTNEPS2BF16 dest, src
    VL = (128,256,512)
    KL = VL/16
    origdest := dest for i := 0 to kl/2-1:
            if k1[i] or *no writemask*:
                    if src is memory and evex.b == 1:
                            t := src.fp32[0]
                    else:
                            t := src.fp32[i]

dest.word[i] := convert_fp32_to_bfloat16(t)

else if *zeroing*:
                    dest.word[i] := 0
            else: // merge masking, dest element unchanged
                    dest.word[i] := origdest.word[i]

dest[max_vl-1:vl/2] := 0
```

FIG. 3A

Instruction 321

| Opcode<br>VCVTNE2PS2BF16*<br>322 | Destination<br>Location<br>(reg / mem)<br>324 | First Source<br>Location<br>(reg / tile / mem)<br>326 | Second Source<br>Location<br>(reg / tile / mem)<br>328 | {k}<br>330 | {Z}<br>331 |
|---|---|---|---|---|---|

```
                            Pseudocode
                               335
VCVTNE2PS2BF16 dest, src1, src2
    VL = (128,256,512)
    KL = VL/16
    origdest := dest
    for i := 0 to kl-1:
            if k1[i] or *no writemask*:
                    if src is memory and evex.b == 1:
                            t := src2.fp32[0]
                    else if i < kl/2:
                            t := src2.fp32[i]
                    else:
                            t := src1.fp32[i-kl/2]

// see VCVTNEPS2BF16 for definition of convert helper function
                    dest.word[i] := convert_fp32_to_bfloat16(t)

else if *zeroing*:
                    dest.word[i] := 0
            else: // merge masking, dest element unchanged
                    dest.word[i] := origdest.word[i]

dest[max_vl-1:vl] := 0
```

FIG. 3B

Pseudocode
340

Helper Function
```
define convert_fp32_to_bfloat16(x):
if x is zero or denormal:
        dest[15] := x[31] // sign preserving zero (denormal go to zero)
        dest[14:0] := 0
else if x is infinity:
        dest[15:0] := x[31:16]
else if x is nan:
        dest[15:0] := x[31:16] // truncate and set msb of the mantisa force qnan
        dest[7] := 1
else // normal number
        lsb := x[16]
        rounding_bias := 0x00007FFF + lsb
        temp[31:0] := x[31:0] + rounding_bias // integer add
        dest[15:0] := temp[31:16]
return dest
```

FIG. 3C

Instruction 401

| Opcode<br>VCVTNEPS2BF16*<br>402 | Destination<br>Location<br>(reg / mem)<br>404 | First Source<br>Location<br>(reg / tile / mem)<br>406 |

400

FETCH, USING FETCH CIRCUITRY, AN INSTRUCTION HAVING FIELDS TO SPECIFY AN OPCODE AND LOCATIONS OF A FIRST SOURCE VECTOR COMPRISING N SINGLE-PRECISION ELEMENTS, AND A DESTINATION VECTOR COMPRISING AT LEAST N 16-BIT FLOATING-POINT ELEMENTS, THE OPCODE TO INDICATE EXECUTION CIRCUITRY IS TO CONVERT EACH OF THE ELEMENTS OF THE SPECIFIED SOURCE VECTOR TO 16-BIT FLOATING-POINT, THE CONVERSION TO INCLUDE TRUNCATION AND ROUNDING, AS NECESSARY, AND TO STORE EACH CONVERTED ELEMENT INTO A CORRESPONDING LOCATION OF THE SPECIFIED DESTINATION VECTOR
421

DECODE, USING DECODE CIRCUITRY, THE FETCHED INSTRUCTION
423

SCHEDULE EXECUTION OF THE DECODED INSTRUCTION
425

RESPOND, USING EXECUTION CIRCUITRY, TO THE DECODED INSTRUCTION AS SPECIFIED BY THE OPCODE
427

COMMIT A RESULT OF THE EXECUTED INSTRUCTION
429

FIG. 4A

Instruction 451

| Opcode VCVTNE2PS2BF16* 452 | Destination Location (reg / mem) 454 | First Source Location (reg / tile / mem) 456 | Second Source Location (reg / tile / mem) 462 |

450

FETCH, USING FETCH CIRCUITRY, AN INSTRUCTION HAVING FIELDS TO SPECIFY AN OPCODE AND LOCATIONS OF FIRST AND SECOND SOURCE VECTORS EACH COMPRISING N SINGLE-PRECISION ELEMENTS, AND A DESTINATION VECTOR COMPRISING N TIMES TWO 16-BIT FLOATING-POINT ELEMENTS, THE OPCODE TO INDICATE EXECUTION CIRCUITRY IS TO CONVERT EACH OF THE ELEMENTS OF THE SPECIFIED FIRST AND SECOND SOURCE VECTORS TO 16-BIT FLOATING-POINT, THE CONVERSION TO INCLUDE TRUNCATION AND ROUNDING, AS NECESSARY, AND TO STORE EACH CONVERTED ELEMENT INTO A CORRESPONDING LOCATION OF THE SPECIFIED DESTINATION VECTOR
471

DECODE, USING DECODE CIRCUITRY, THE FETCHED INSTRUCTION
473

SCHEDULE EXECUTION OF THE DECODED INSTRUCTION
475

RESPOND, USING EXECUTION CIRCUITRY, TO THE DECODED INSTRUCTION AS SPECIFIED BY THE OPCODE
477

COMMIT A RESULT OF THE EXECUTED INSTRUCTION
479

FIG. 4B

VCVTNEPS2BF16 Instruction 500

| Opcode VCVTNEPS2BF16* 502 | Destination Location (reg / mem) 504 | First Source Location (reg / mem) 506 | Mask {k} 508 | Zeroing {Z} 510 | Element Format 514 | Vector Size (N) 516 | Rounding Mode 518 |

FIG. 5A

VCVTNE2PS2BF16 Instruction 550

| Opcode VCVTNE2PS2BF16* 552 | Destination Location (reg / mem) 554 | First Source Location (reg / mem) 556 | Second Source Location (reg / mem) 562 | Mask {k} 558 | Zeroing {Z} 560 | Element Format 564 | Vector Size (N) 566 | Rounding Mode 568 |

FIG. 5B

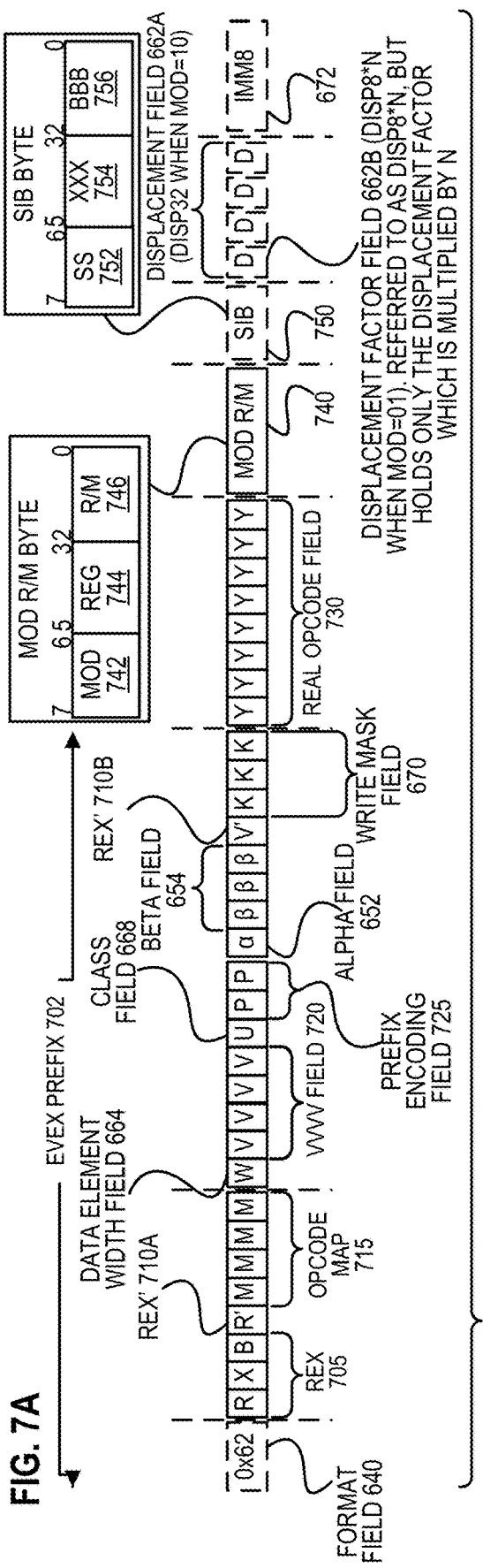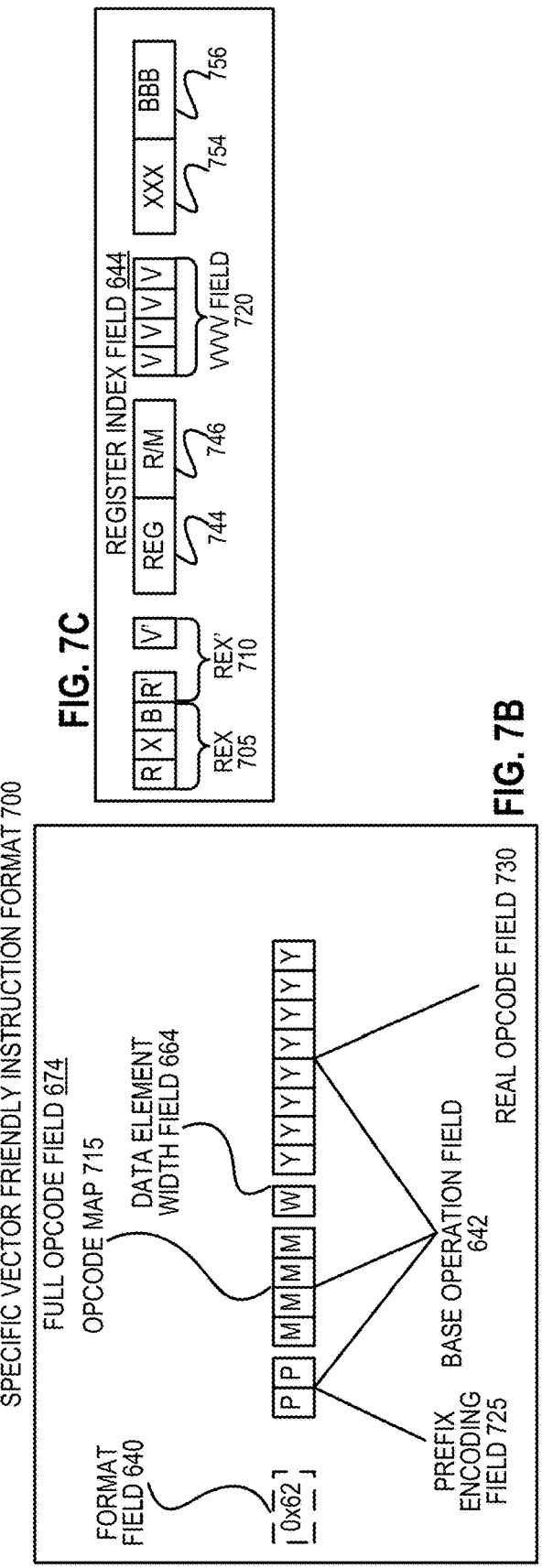

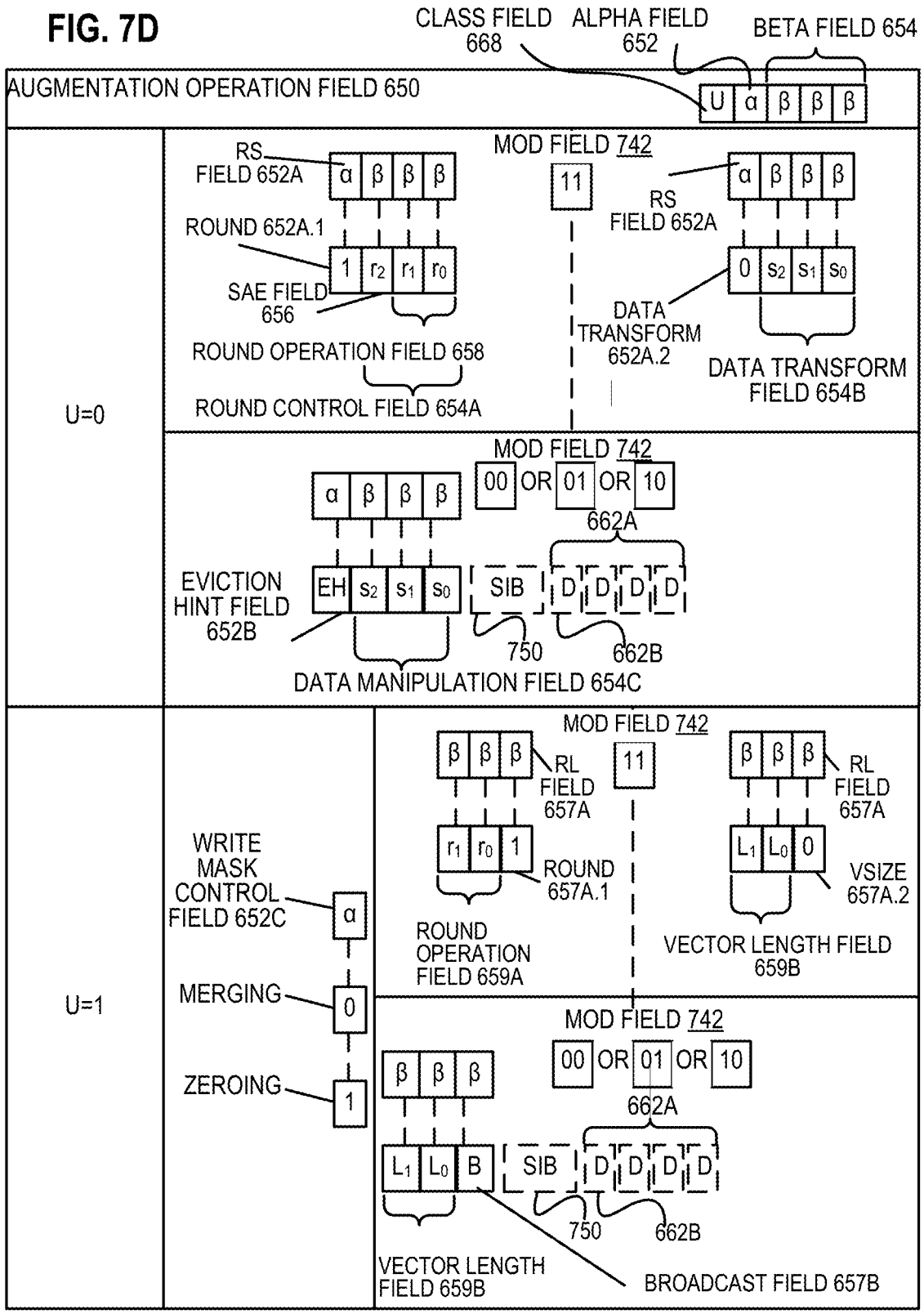

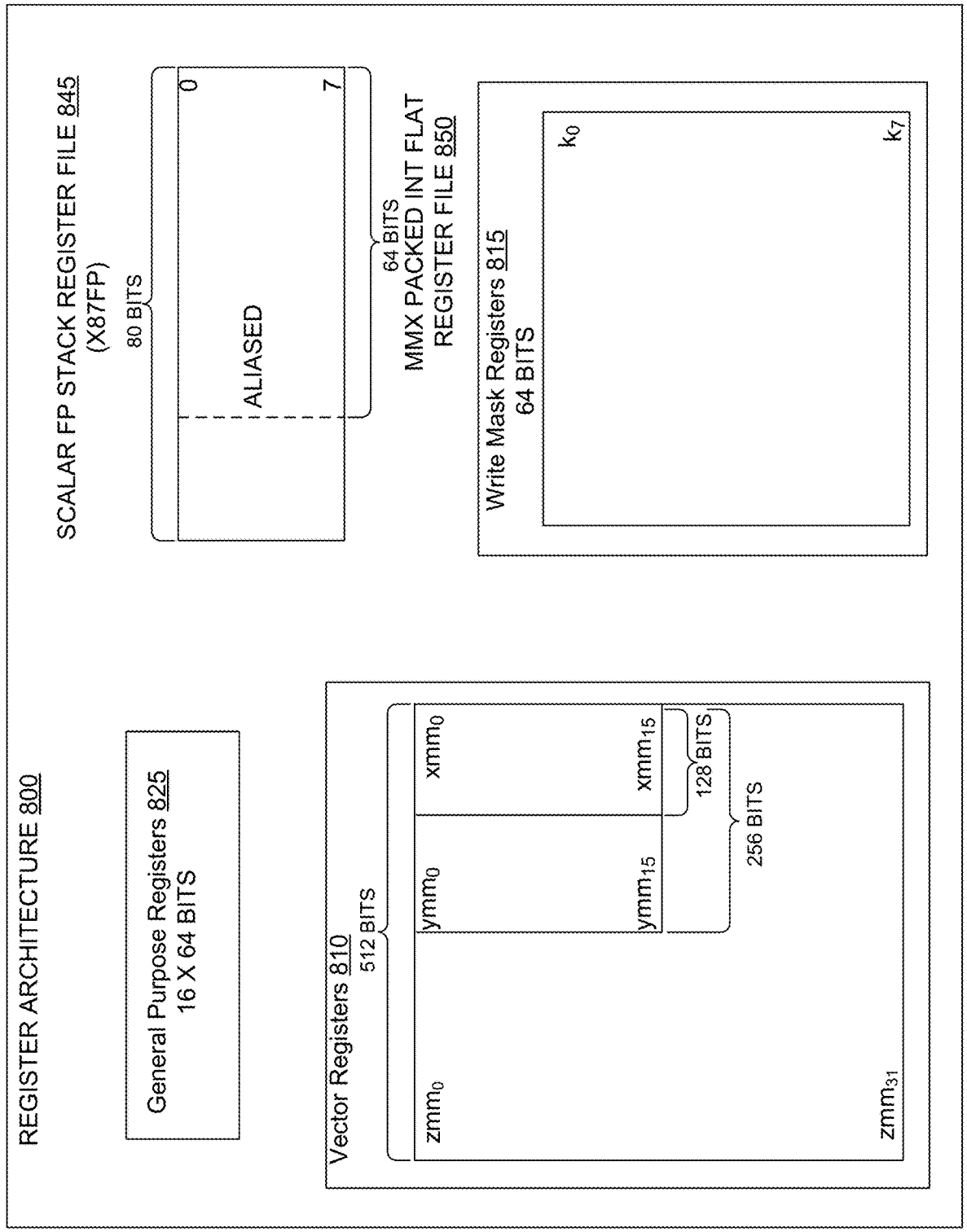

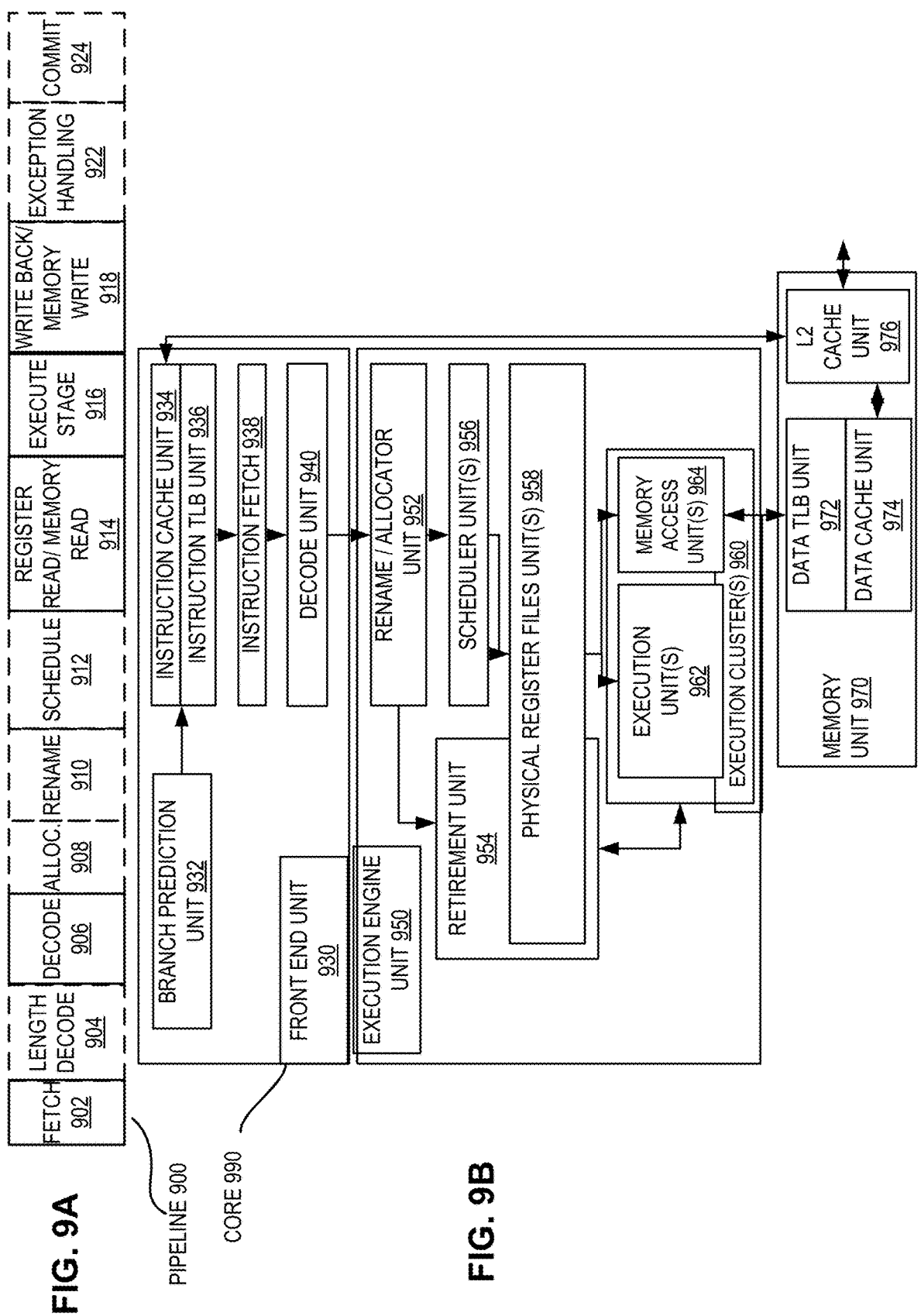

SYSTEMS AND METHODS FOR PERFORMING INSTRUCTIONS TO CONVERT TO 16-BIT FLOATING-POINT FORMAT

CROSS-REFERENCE TO RELATED APPLICATIONS

The present patent application is a continuation application claiming priority from U.S. patent application Ser. No. 17/851,468 filed Jun. 28, 2022, now U.S. Pat. No. 12,131,154, which is a continuation application claiming priority from U.S. patent application Ser. No. 16/186,384 filed Nov. 9, 2018, now U.S. Pat. No. 11,372,643, each of which is hereby incorporated herein by reference in its entirety.

FIELD OF THE INVENTION

The field of invention relates generally to computer processor architecture, and, more specifically, to systems and methods for performing instructions to convert to 16-bit floating-point format.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifics the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 512-bit register may be specified as a source operand to be operated on as sixteen separate 32-bit single-precision floating-point data elements. As another example, the bits in a 256-bit register may be specified as a source operand to be operated on as sixteen separate 16-bit floating-point packed data elements, eight separate 32-bit packed data elements (double word size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions.

Some applications that process vectors having single-precision perform almost equally as well using 16-bit floating-point formatted vectors instead.

BRIEF DESCRIPTION OF THE DRAWINGS

FIG. 3A is pseudocode illustrating exemplary execution of a format-convert (VCVTNEPS2BF16) instruction, according to an embodiment;

FIG. 3B is pseudocode illustrating exemplary execution of a 2-input format-convert (VCVTNE2PS2BF16) instruction, according to an embodiment;

FIG. 3C is pseudocode illustrating a helper function for use with the pseudocode of FIGS. 3A and 3B, according to an embodiment;

FIG. 4A is a process flow diagram illustrating a processor responding to a format-convert (VCVTNEPS2BF16) instruction, according to an embodiment;

FIG. 4B is a process flow diagram illustrating a processor responding to a 2-input format-convert (VCVTNE2PS2BF16) instruction, according to an embodiment;

FIG. 5A is a block diagram illustrating a format of a format-convert (VCVTNEPS2BF16) instruction, according to an embodiment;

FIG. 5B is a block diagram illustrating a format of a 2-input format-convert (VCVTNE2PS2BF16) instruction, according to an embodiment;

FIG. 6A is a block diagram illustrating a generic vector friendly instruction format and class A instruction templates thereof according to some embodiments of the invention;

FIG. 6B is a block diagram illustrating the generic vector friendly instruction format and class B instruction templates thereof according to some embodiments of the invention;

FIG. 7A is a block diagram illustrating an exemplary specific vector friendly instruction format according to some embodiments of the invention;

FIG. 7B is a block diagram illustrating the fields of the specific vector friendly instruction format that make up the full opcode field according to one embodiment;

FIG. 7C is a block diagram illustrating the fields of the specific vector friendly instruction format that make up the register index field according to one embodiment;

FIG. 7D is a block diagram illustrating the fields of the specific vector friendly instruction format that make up the augmentation operation field according to one embodiment;

FIG. 8 is a block diagram of a register architecture according to one embodiment;

FIG. 9A is a block diagram illustrating both an exemplary in-order pipeline and an exemplary register renaming, out-of-order issue/execution pipeline according to some embodiments;

FIG. 9B is a block diagram illustrating both an exemplary embodiment of an in-order architecture core and an exemplary register renaming, out-of-order issue/execution architecture core to be included in a processor according to some embodiments;

FIG. 10A is a block diagram of a single processor core, along with its connection to the on-die interconnect network and with its local subset of the Level 2 (L2) cache, according to some embodiments;

FIG. 10B is an expanded view of part of the processor core in FIG. 10A according to some embodiments;

FIG. 12 is a block diagram of a system in accordance with some embodiments;

FIG. 13 is a block diagram of a first more specific exemplary system in accordance with some embodiment;

FIG. 14 is a block diagram of a second more specific exemplary system in accordance with some embodiments;

FIG. 15 is a block diagram of a System-on-a-Chip (SoC) in accordance with some embodiments.

DETAILED DESCRIPTION OF THE EMBODIMENTS

Figure 1:
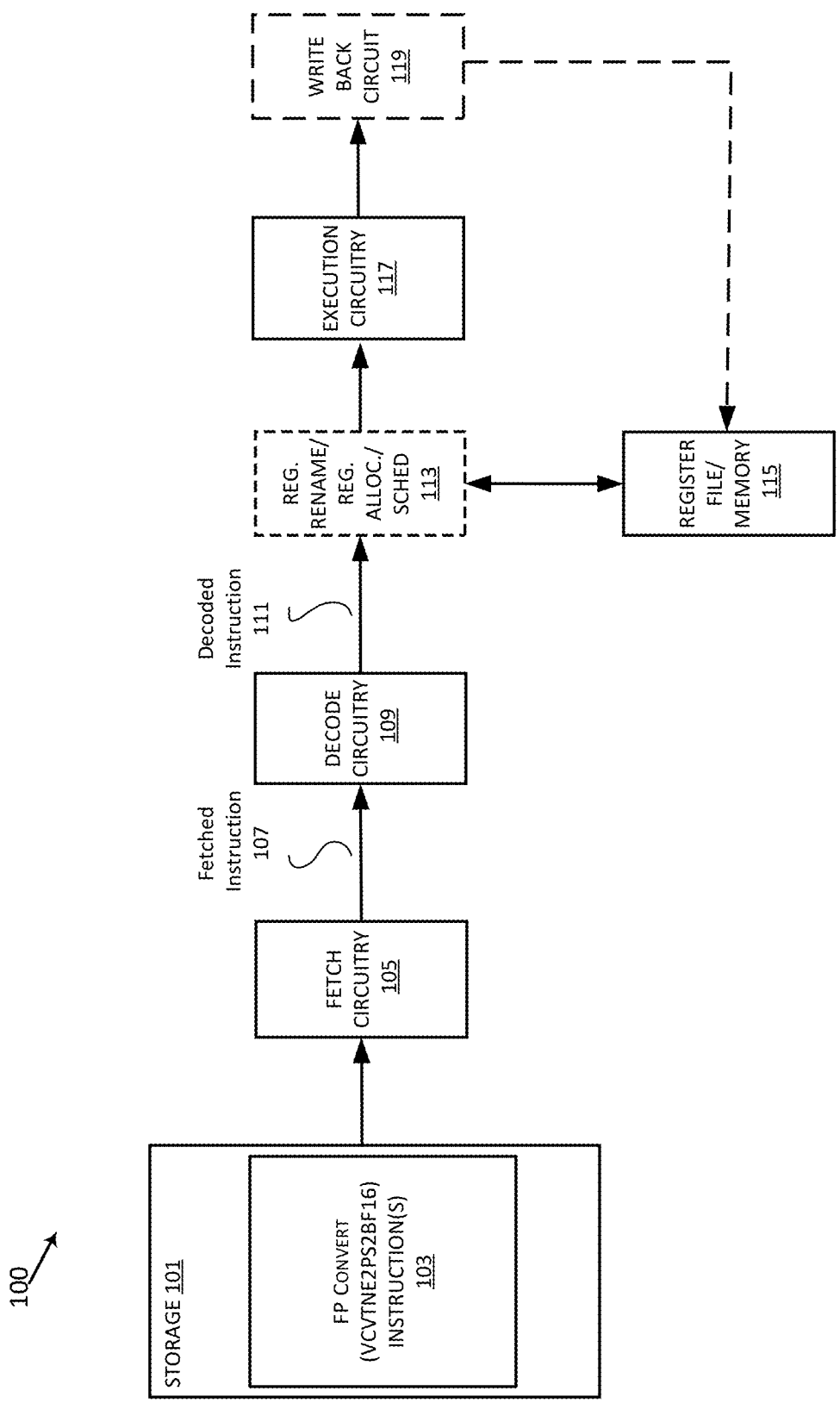
FIG. 1 is a block diagram illustrating processing components for executing a format-convert (VCVTNEPS2BF16 or VCVTNE2PS2BF16) instruction, according to an embodiment.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

As mentioned above, applications that process vectors having single-precision sources perform almost equally as well using 16-bit floating-point formatted vectors instead. Disclosed herein and illustrated by way of the figures is a vector packed data format-convert instruction (VCVTNEPS2BF16 and VCVTNE2PS2BF16) that implements format conversion of either one or two source vectors. The VCVTNEPS2BF16 mnemonic indicates: "VCVT"=Vector ConVerT, "NE"=rounding to Nearest Even, "PS"=Packed Single-precision source, "2"=to, and "BF16"=BFloat16. The 2-input version of the instruction takes two source vectors each having N single-precision elements and generates a destination vector having 2 times N 16-bit floating-point formatted elements. The 2-input version allows a balanced solution where N-element source vectors are converted into N-element destination vectors. With such a balanced solution, all operands, be they source or destination operands, can be stored in the same type of vector registers, be they 128-bit, 256-bit, or 512-bit vector registers. An exemplary processor register file is illustrated and described at least with respect to FIG. 8.

As compared to algorithms that use single-precision for both the source and destination elements, the disclosed format-convert (VCVTNEPS2BF16 or VCVTNE2PS2BF16) instruction is expected to achieve comparable quality, but with reduced memory utilization and memory bandwidth requirements, which would serve to improve performance and power efficiency, especially in a machine learning context.

Relevant Floating-Point Formats 16-bit floating-point formats used by disclosed embodiments include bfloat16 (defined by Google, Inc., of Mountain View, California), which is sometimes referred to herein as "bf16 or BF16," and binary 16 (promulgated as IEEE754-2008 by the institute of Electrical and Electronics Engineers), which is sometimes referred to herein as "half-precision" or "fp16." 32-bit floating-point formats used by disclosed embodiments include binary32 (also promulgated as part of IEEE754-2008), which is sometimes referred to herein as "single-precision" or "fp32."

Table 1 lists some relevant characteristics and distinctions among the relevant data formats. As shown, all three formats include one sign bit. The binary32, binary16, and bfloat16 have exponent widths of 8 bits, 5 bits, and 8 bits, respectively, and significand (sometimes referred to herein as "mantissa" or "fraction") bits of 24 bits, 11 bits, and 8 bits, respectively. One advantage of bfloat16 over fp16 is that one can truncate fp32 numbers and have a valid bfloat16 number.

TABLE 1

| Format | Bits | Sign | Exponent | Significand |
|---|---|---|---|---|
| Binary32 | 32 | 1 | 8 bits | 24 bits |
| Binary16 | 16 | 1 | 5 bits | 11 bits |
| Bfloat16 | 16 | 1 | 8 bits | 8 bits |

A processor implementing the disclosed format-convert (VCVTNEPS2BF16 or VCVTNE2PS2BF16) instruction would include fetch circuitry to fetch an instruction having fields to specify an opcode and locations of first source, second source (for 2-input version), and destination vectors. The format of the format-convert (VCVTNEPS2BF16 or VCVTNE2PS2BF16) instruction is further illustrated and described at least with respect to FIGS. 5A-B, 6A-B, and 7A-D. The specified source and destination vectors may be located in vector registers or in memory. The opcode to indicate execution circuitry is to convert each of the elements of the specified source vector to 16-bit floating-point, the conversion to include truncation and rounding, as necessary, and to store each converted element into a corresponding location of the specified destination vector. Such a processor would further include decode circuitry to decode the fetched instruction, and execution circuitry to respond to the decoded instruction as specified by the opcode. Execution circuitry is further described and illustrated below, at least at least with respect to FIGS. 1-2D, 9A-B and 10A-B.

FIG. 1 is a block diagram illustrating processing components for executing a format-convert (VCVTNEPS2BF16 or VCVTNE2PS2BF16) instruction, according to some embodiments. As shown, computing system 100 includes storage 101 to store format-convert instruction(s) 103 to be executed. In some embodiments, computing system 100 is a SIMD processor to concurrently process multiple elements of packed-data vectors.

In operation, the format-convert instruction(s) 103 is fetched from storage 101 by fetch circuitry 105. The format-convert instruction(s) 103 has fields, not shown here, to specify an opcode and locations of a first source vector comprising N single-precision elements, and a destination vector comprising at least N 16-bit floating-point elements, the opcode to indicate execution circuitry is to convert each of the elements of the specified source vector to 16-bit floating-point format, the conversion to include truncation and rounding, as necessary, and to store each converted element into a corresponding location of the specified destination vector. The format-convert (VCVTNEPS2BF16 or VCVTNE2PS2BF16) instruction format is further illustrated and described at least with respect to FIGS. 5A-B, 6A-B, and 7A-D.

The fetched format-convert instruction 107 is decoded by decode circuitry 109, which decodes the fetched format-convert (VCVTNEPS2BF16 or VCVTNE2PS2BF16) instruction 107 into one or more operations. In some embodiments, this decoding includes generating a plurality of micro-operations to be performed by execution circuitry (such as execution circuitry 117). Decode circuitry 109 also decodes instruction suffixes and prefixes (if used).

Execution circuitry 117, which has access to register file and memory 115, is to respond to decoded instruction 111 as specified by the opcode, and is further described and illustrated below, at least with respect to FIGS. 2A-D, 3A-C, 4A-B, 9A-B and 10A-B.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded format-convert (VCVTNEPS2BF16 or VCVTNE2PS2BF16) instruction 111 for execution on execution circuitry 117 out of an instruction pool (e.g., using a reservation station in some embodiments).

In some embodiments, writeback circuit 119 is to write back results of the executed instruction. Writeback circuit 119 and register rename/scheduling circuit 113 are optional, as indicated by their dashed borders, insofar as they may occur at different times, or not at all.

Figure 2A:
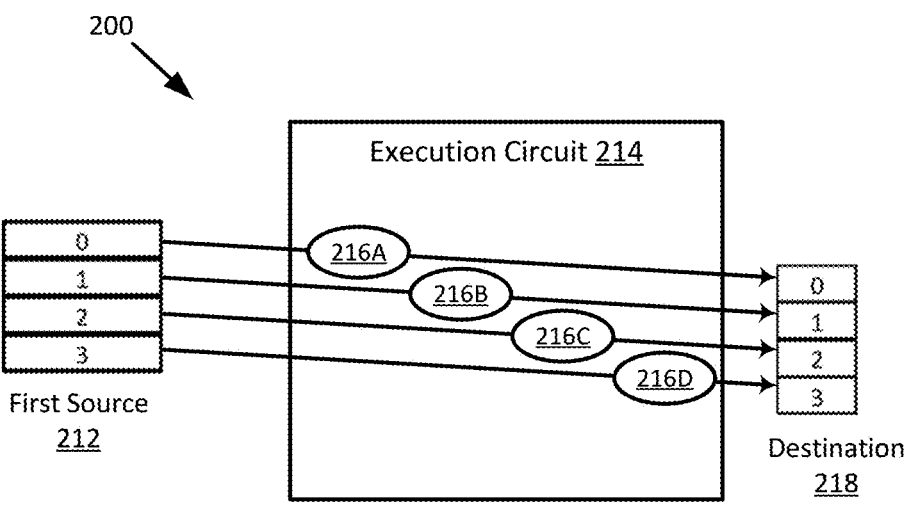
FIG. 2A is a block diagram illustrating execution of a format-convert (VCVTNEPS2BF16) instruction, according to an embodiment.

FIG. 2A is a block diagram illustrating execution of a format-convert (VCVTNEPS2BF16) instruction, according to an embodiment. As shown, computing apparatus 200 (e.g., a processor) is to receive, fetch, and decode (fetch and decode circuitry not shown here, but are illustrated and described at least with respect to FIG. 1 and FIGS. 9A-B) format-convert instruction 201. Format-convert instruction 201 includes fields to specify opcode 202 (VCVTNEPS2BF16) and locations of first source vector 206 comprising N single-precision elements, and destination vector 204 comprising at least N 16-bit floating-point (e.g., bfloat16 or binary16) elements.

Figure 2B:
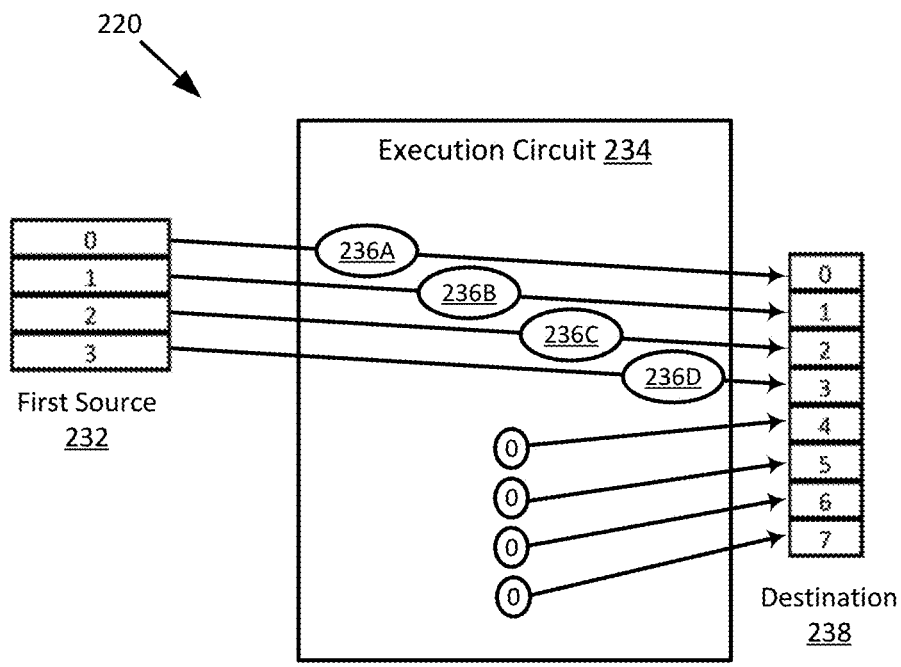
FIG. 2B is a block diagram illustrating execution of a format-convert (VCVTNEPS2BF16) instruction, according to an embodiment.
Figure 2C:
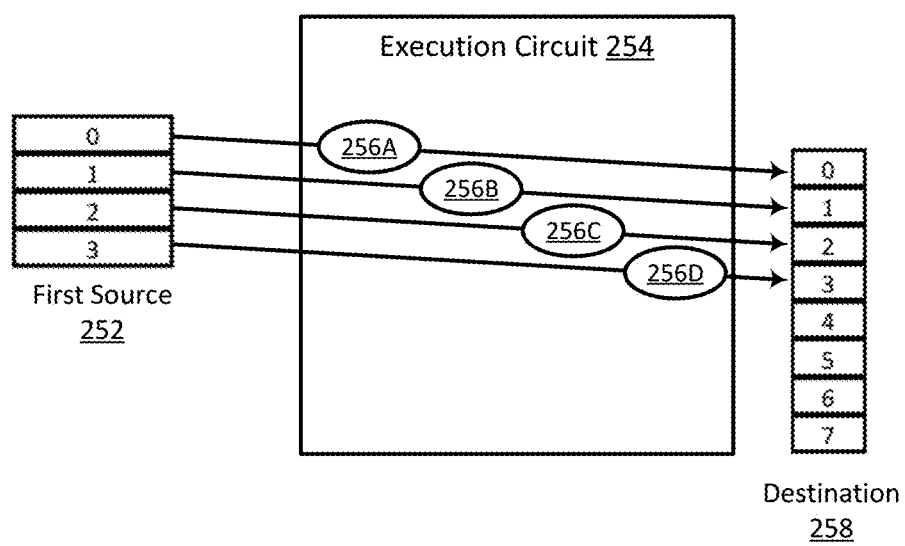
FIG. 2C is a block diagram illustrating execution of a format-convert (VCVTNEPS2BF16) instruction, according to an embodiment.
Figure 2D:
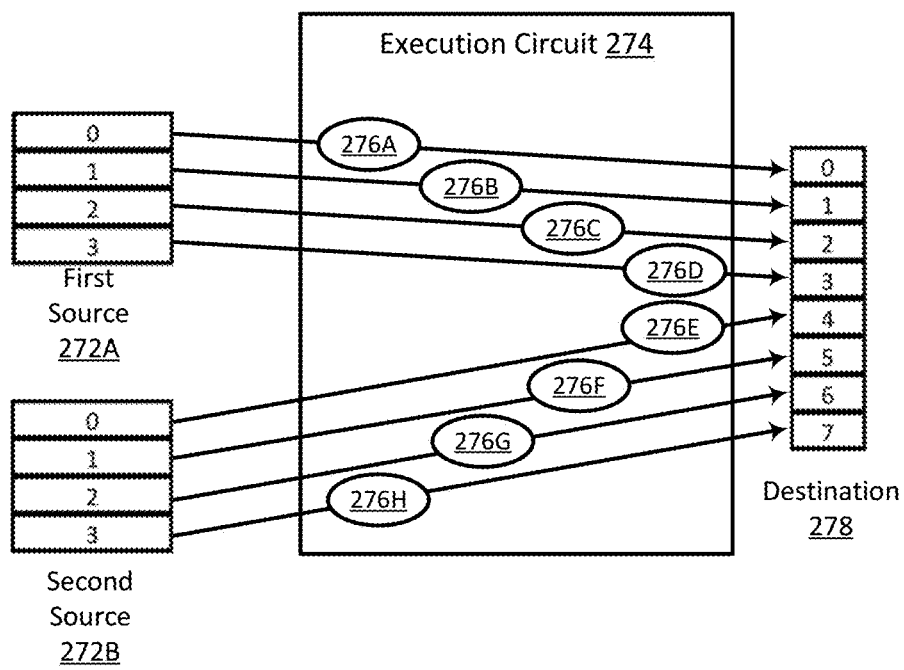
FIG. 2D is a block diagram illustrating execution of a 2-input format-convert (VCVTNE2PS2BF16) instruction, according to an embodiment.

Here, N equals 4, and both specified first source 212 and destination 218 vectors have four elements. But the source and destination vectors are not balanced, insofar as they have different widths. Software could issue an unbalanced format-convert instruction 201 by assigning different-sized vectors to the source and destination vectors, for example by assigning a 256-bit ymm vector as the source and a 128-bit xmm vector as the destination. FIGS. 2B-D illustrate scenarios where balance is achieved by assigning the same types of vectors to both source and destination. An exemplary processor register file is further illustrated and described, at least with respect to FIG. 8.

In some embodiments, format-convert instruction 201 also includes a mask {k} 208 and a zeroing control {z} 210. The format of format-convert instruction 201, with opcode of VCVTNEPS2BF16, is further illustrated and described at least with respect to FIGS. 5A, 6A-B, and 7A-D. Also shown are specified first source vector 212, execution circuitry 214, which includes conversion circuitry 216A-D, and specified destination vector 218.

In operation, computing apparatus 200 (e.g., a processor), is to fetch and decode, using fetch and decode circuitry (not shown), instruction 201 having fields to specify opcode 202 and locations of first source 206 and destination 204 vectors, the opcode to indicate the computing apparatus (e.g., processor) is to convert each of the elements of the specified first source vector 212 to 16-bit floating-point format (e.g., bfloat16), the converter circuitry 216A-D to include truncation and rounding, as necessary, and to store each converted element into a corresponding location of the specified destination vector 218. As is further illustrated and described at least with respect to FIGS. 5A, 6A-B, and 7A-D, instruction 201 in other embodiments can specify different vector lengths, such as 128 bits, 512 bits, or 1024 bits. Execution circuitry 214 here is to respond to the decoded instruction as specified by opcode 202.

FIG. 2B is a block diagram illustrating execution of a format-convert (VCVTNEPS2BF16) instruction, according to an embodiment. As shown, computing apparatus 220 (e.g., a processor) is to receive, fetch, and decode (fetch and decode circuitry not shown here, but are illustrated and described at least with respect to FIG. 1 and FIGS. 9A-B), format-convert instruction 221, which includes fields to specify opcode 222 (VCVTNEPS2BF16) and locations of first source vector 226 comprising N single-precision elements, and destination vector 224 comprising at least N 16-bit floating-point (e.g., bfloat16 or binary16) elements.

Here, balance is achieved by assigning the same type of register as the specified first source 232 and destination 238. However, the specified destination vector 238, having half the width of the specified first source vector 232, has twice as many entries. In operation, the converted entries are written to the first four destination entries, and zeroes are written to the remaining four entries.

In some embodiments, format-convert instruction 221 also includes a mask {k} 228 and a zeroing control {z} 230. The format of format-convert instruction 221, with opcode of VCVTNEPS2BF16, is further illustrated and described at least with respect to FIGS. 5A, 6A-B, and 7A-D. Also shown are specified first source vector 232, execution circuitry 234, which includes conversion circuitry 236A-D, and specified destination vector 238.

In operation, computing apparatus 220 (e.g., a processor), is to fetch and decode, using fetch and decode circuitry (not shown), instruction 221 having fields to specify opcode 222 (i.e., VCVTNEPS2BF16) and locations of first source 226 and destination 224 vectors, the opcode to indicate the computing apparatus 220 (e.g., processor) is to convert, using converters 236A-D in execution circuitry 234, each of the elements of the specified first source vector 232 to 16-bit floating-point format (e.g., bfloat16), the converter circuitry 236A-D to include truncation and rounding, as necessary, and to store each converted element into a corresponding location of the specified destination vector 238. Here, the corresponding destination vector locations comprise the first four elements, with zeroes being written to the remaining four elements. As is further illustrated and described at least with respect to FIGS. 5A, 6A-B, and 7A-D, instruction 221 in other embodiments can specify different vector lengths, such as 128 bits, 512 bits, or 1024 bits. Execution circuitry 234 here is to respond to the decoded instruction as specified by opcode 222.

FIG. 2C is a block diagram illustrating execution of a format-convert (VCVTNEPS2BF16) instruction, according to an embodiment. As shown, computing apparatus 240 (e.g., a processor) is to receive, fetch, and decode (fetch and decode circuitry not shown here, but are illustrated and described at least with respect to FIG. 1 and FIGS. 9A-B), format-convert instruction 241, which includes fields to specify opcode 242 (VCVTNEPS2BF16) and locations of first source vector 246 comprising N single-precision elements, and destination vector 244 comprising at least N 16-bit floating-point (e.g., bfloat16 or binary16) elements.

Here, balance is achieved by assigning the same type of register as the specified first source 252 and destination 258 vectors. However, the specified destination vector 258, having half the width of the specified first source vector 252, has twice as many entries. In operation, the converted entries are written to the first four destination entries, and zeroes are written to the remaining four entries. The zeroing is not shown in FIG. 2C but is to be done implicitly in this embodiment.

The implicit zeroing in some embodiments is a default treatment of masked elements. In other embodiments, an architectural model-specific register (MSR) is to be programmed by software to control whether to apply zeroing or masking to masked elements. In yet other embodiments, the zeroing behavior is specified by the format convert instruction.

In some embodiments, format-convert instruction 241 also includes a mask {k} 248 and a zeroing control {z} 250. The format of format-convert instruction 241, with opcode of VCVTNEPS2BF16, is further illustrated and described at least with respect to FIGS. 5A, 6A-B, and 7A-D.

Also shown are specified first source vector 252, execution circuitry 254, which includes conversion circuitry 256A-D, and specified destination vector 258.

In operation, computing apparatus 240 (e.g., a processor), is to fetch and decode, using fetch and decode circuitry (not shown), instruction 241 having fields to specify opcode 242 (i.e., VCVTNEPS2BF16) and locations of first source 246 and destination 244 vectors, the opcode to indicate the computing apparatus 240 (e.g., processor) is to convert, using converters 256A-D in execution circuitry 254, each of the elements of the specified first source vector 252 to 16-bit floating-point format (e.g., bfloat16), the converter circuitry 256A-D to include truncation and rounding, as necessary, and to store each converted element into a corresponding location of the specified destination vector 258. Here, the corresponding destination vector locations comprise the first four elements, with zeroes being implicitly written to the remaining four elements. The implicit zeroing in some embodiments is a default treatment of masked elements. In other embodiments, an architectural model-specific register (MSR) is to be programmed by software to control whether to apply zeroing or masking to masked elements. In yet other embodiments, the zeroing behavior is specified by the format convert instruction.

As is further illustrated and described at least with respect to FIGS. 5A, 6A-B, and 7A-D, instruction 241 in other embodiments can specify different vector lengths, such as 128bits, 512 bits, or 1024 bits. Execution circuitry 254 here is to respond to the decoded instruction as specified by opcode 242.

FIG. 2D is a block diagram illustrating execution of a format-convert (VCVTNE2PS2BF16) instruction, according to an embodiment. As shown, computing apparatus 260 (e.g., a processor) is to receive, fetch, and decode (fetch and decode circuitry not shown here, but are illustrated and described at least with respect to FIG. 1 and FIGS. 9A-B), format-convert instruction 261, which includes fields to specify opcode 262 (VCVTNE2PS2BF16) and locations of first and second source vectors 266 and 268 comprising N single-precision elements, and destination vector 264 comprising at least N 16-bit floating-point (e.g., bfloat16 or binary16) elements. Here, N equals 4 and the specified destination vector 264 includes 8 elements.

Here, the destination vector has half the width as the source vectors, but balance is achieved by assigning two source vectors whose elements are to be converted and written to the destination. In operation, the converted entries from the specified first source 272A are written to the first four entries of specified destination 278, and the converted entries from the specified second source 272B are written to the last four entries of specified destination 278.

In some embodiments, format-convert instruction 261 also includes a mask {k} 268 and a zeroing control {z} 270. The format of format-convert instruction 261, with opcode of VCVTNEPS2BF16, is further illustrated and described at least with respect to FIGS. 5A, 6A-B, and 7A-D.

Also shown are specified first and second source vectors 272A-B, execution circuitry 274, which includes conversion circuitry 276A-H, and specified destination vector 278.

In operation, computing apparatus 260 (e.g., a processor), is to fetch and decode, using fetch and decode circuitry (not shown), instruction 261 having fields to specify opcode 262 (i.e., VCVTNE2PS2BF16) and locations of first and second sources 266 and 268 and destination 264 vectors, the opcode to indicate the computing apparatus 260 (e.g., processor) is to convert, using converters 276A-H in execution circuitry 274, each of the elements of the specified first and second source vectors 272A-B to 16-bit floating-point format (e.g., bfloat16), the converter circuitry 276A-H to include truncation and rounding, as necessary, and to store each converted element into a corresponding location of the specified destination vector 278. Here, the first four elements of specified destination 278 correspond to the specified first source 272A, and the last four elements of specified destination 278 correspond to the specified second source 272B. As is further illustrated and described at least with respect to FIGS. 5A, 6A-B, and 7A-D, instruction 261 in other embodiments can specify different vector lengths, such as 128 bits, 512 bits, or 1024 bits. Execution circuitry 274 here is to respond to the decoded instruction as specified by opcode 262.

FIG. 3A is pseudocode illustrating exemplary execution of a format-convert (VCVTNEPS2BF16) instruction, according to an embodiment. As shown, format-convert instruction 301 has fields to specify opcode 302 (VCVTNEPS2BF16), and locations of first source 306 (src) and destination 304 (dest) vectors, which, according to constant VL, which is instantiated in the code and stands for "vector length," can be any of 128 bits, 256 bits, and 512 bits. In some embodiments, instruction 301 further has fields to specify a mask 308 and zeroing control 310. Pseudocode 315 also shows use of a writemask to control whether to mask each of the destination elements, with masked elements being either zeroed or merged (as is further illustrated and described at least with respect to FIGS. 5A, 6A-B, and 7A-D, the format-convert instruction in some embodiments includes fields to specify the mask and to control whether to zero or merge). Execution of the format-convert instruction 301 is further illustrated and described at least with respect to FIGS. 2A-C, 4A, and 9A-B.

FIG. 3B is pseudocode illustrating exemplary execution of a 2-input format-convert (VCVTNE2PS2BF16) instruction, according to an embodiment. As shown, format-convert instruction 321 has fields to specify opcode 322 (VCVTNE2PS2BF16), and locations of first source 326 (src1), second source 328 (src2), and destination 324 (dest) vectors. The destination vector, according to constant VL, can be any of 128 bits, 256 bits, and 512 bits. Here, the source vector locations can be either in memory or in registers. In some embodiments, format-convert instruction 321 has fields to specify a writemask {k} 330, and zeroing control {z} 331. Pseudocode 335 also shows use of a writemask to control whether to mask each of the destination elements, with masked elements being either zeroed or merged (as is further illustrated and described at least with respect to FIGS. 5A, 6A-B, and 7A-D, the format-convert instruction in some embodiments includes fields to specify the mask and to control whether to zero or merge). Execution of the format-convert instruction 321 is further illustrated and described at least with respect to FIGS. 2D, 4B, and 9A-B.

FIG. 3C is pseudocode illustrating a helper function for use with the pseudocode of FIGS. 3A-B, according to an embodiment. Here, pseudocode 354 defines a helper function, convert_fp32_to_bfloat16( ), which converts from a binary32 format to a bfloat16 format.

Pseudocode 340 illustrates that disclosed embodiments, in contrast to a simple conversion that would just truncate the lower sixteen bits of the binary32 number, advantageously perform rounding of normal numbers and considers a rounding_bias. The code illustrates that the format-convert instruction has an improved rounding behavior than just truncating. The rounding behavior of disclosed embodiments facilitates more accurate computation than conversion by truncation. In some embodiments, execution circuitry adheres to rounding behavior according to rounding rules promulgates as IEEE 754, for example, "NE" which indicates rounding to nearest even. In some embodiments, the rounding behavior is specified by the instruction, for example by including a suffix, "NE," in the opcode to indicate rounding to N̲earest E̲ven. In other embodiments, the rounding behavior adopts a default behavior, like "NE." In yet other embodiments, the rounding behavior is controlled by an architectural model-specific register (MSR) that is configured by software.

Pseudocode 340 also illustrates that disclosed embodiments perform truncation when necessary, for example if the input to the function is not a number (nan).

Execution of the format-convert instruction is further illustrated and described at least with respect to FIGS. 2A-D, 3A-B, 4A-B, and 9A-B.

FIG. 4A is a process flow diagram illustrating a processor responding to a format-convert (VCVTNEPS2BF16) instruction, according to an embodiment. Format-convert instruction 401 includes fields to specify opcode 402 (VCVTNEPS2BF16) and locations of first source vector 406 comprising N single-precision elements, and destination vector 404 comprising at least N 16-bit floating-point (e.g., bfloat16 or binary16) elements.

As shown, the processor is to respond to a decoded format-convert instruction by performing flow 400. At 421, the processor is to fetch, using fetch circuitry, an instruction having fields to specify an opcode (e.g., VCVTNEPS2BF16) and locations of a first source vector comprising N single-precision elements, and a destination vector comprising at least N 16-bit floating-point (e.g., bfloat16 or binary16) elements, the opcode to indicate execution circuitry is to convert each of the elements of the specified source vector to 16-bit floating-point, the conversion to include truncation and rounding, as necessary, and to store each converted element into a corresponding location of the specified destination vector. At 423, the processor is to decode, using decode circuitry, the fetched instruction. In some embodiments, the processor at 425 is to schedule execution of the decoded instruction. At 427, the processor is to respond, using execution circuitry, to the decoded instruction as specified by the opcode. In some embodiments, the processor at 429 is to commit a result of the executed instruction. Operations 425 and 429 are optional, as indicated by their dashed borders, insofar as they may occur at a different time, or not at all.

FIG. 4B is a process flow diagram illustrating a processor responding to a 2-input format-convert (VCVTNE2PS2BF16) instruction, according to an embodiment. Format-convert instruction 451 includes fields to specify opcode 452 (VCVTNE2PS2BF16) and locations of first and second source vectors 456 and 462 comprising N single-precision elements, and destination vector 454 comprising at least N 16-bit floating-point (e.g., bfloat16 or binary16) elements.

Note that the invention is not intended to be limited to any particular mnemonic for the opcode. Here, VCVTNEPS2BF16 is chosen as a mnemonic with letters representing various instruction characteristics. "VCVT," for one, is chosen to indicate a Vector ConVerT. "NE," for another, is chosen to represent a round mode, here, Nearest Even, as promulgated by IEEE 754, is selected. "2PS" represents 2 Packed Single. "2" represents "to." Finally, "BF16" represents bfloat16.

As shown, the processor is to respond to a decoded format-convert instruction by performing flow 450. At 471, the processor is to fetch, using fetch circuitry, an instruction having fields to specify an opcode (e.g., VCVTNE2PS2BF16) and locations of first and second source vectors comprising N single-precision elements, and a destination vector comprising at least N 16-bit floating-point (e.g., bfloat16 or binary16) elements, the opcode to indicate execution circuitry is to convert each of the elements of the specified source first and second source vectors to 16-bit floating-point, the conversion to include truncation and rounding, as necessary, and to store each converted element into a corresponding location of the specified destination vector. At 473, the processor is to decode, using decode circuitry, the fetched instruction. In some embodiments, the processor at 475 is to schedule execution of the decoded instruction. At 477, the processor is to respond, using execution circuitry, to the decoded instruction as specified by the opcode. In some embodiments, the processor at 479 is to commit a result of the executed instruction. Operations 475 and 479 are optional, as indicated by their dashed borders, insofar as the may occur at a different time, or not at all.

FIG. 5A is a block diagram illustrating a format of a format-convert (VCVTNEPS2BF16) instruction, according to an embodiment. As shown, format-convert instruction 500 includes fields for specifying an opcode 502 (VCVTNEPS2BF16), and locations of destination 504 and first source 506 vectors. The source and destination vectors can each be located in registers or in memory.

Opcode 502 is shown including an asterisk, which signifies that various optional fields can be added as prefixes or suffixes to the opcode. Namely, format-convert instruction 500 further includes optional parameters to affect instruction behavior, including mask {k} 508, zeroing control {z} 510, element format 514, vector size (N) 516, and rounding mode 518. One or more of instruction modifiers 508, 510, 514, 516, and 518, may be specified using prefixes or suffixes to opcode 502.

In some embodiments, one or more of optional instructions modifiers 508, 510, 514, 516, and 518, are encoded in an immediate field (not shown) optionally included with the instruction 500. In some embodiments, one or more of optional instructions modifiers 508, 510, 514, 516, and 518 is specified via a configuration register, such as model-specific registers (MSRs) included in the instruction set architecture.

The format of format-convert Instruction 500 is further illustrated and described, at least with respect to FIGS. 5B, 6A-B, and 7A-D.

FIG. 5B is a block diagram illustrating a format of a 2-input format-convert (VCVTNE2PS2BF16) instruction, according to an embodiment. As shown, format-convert instruction 550 includes fields for specifying an opcode 552 (VCVTNE2PS2BF16), and locations of destination 554, first source 556, and second source 562 vectors. The source and destination vectors can each be located in registers or in memory.

Opcode 552 is shown including an asterisk, which signifies that various optional fields can be added as prefixes or suffixes to the opcode. Namely, format-convert Instruction 550 further includes optional parameters to affect instruction behavior, including mask {k} 558, zeroing control {z} 560, element format 564, vector size (N) 566, and rounding mode 568. One or more of instruction modifiers 558, 560, 564, and 566 may be specified using prefixes or suffixes to opcode 552.

In some embodiments, one or more of optional instructions modifiers 558, 560, 564, 566, and 568, are encoded in an immediate field (not shown) optionally included with the instruction 550. In some embodiments, one or more of optional instructions modifiers 558, 560, 564, 566, and 568, is specified via a configuration register, such as a model-specific registers (MSR) included in the instruction set architecture.

The format of format-convert Instruction 550 is further illustrated and described, at least with respect to FIGS. 5A, 6A-B, and 7A-D.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source 1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., sec Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
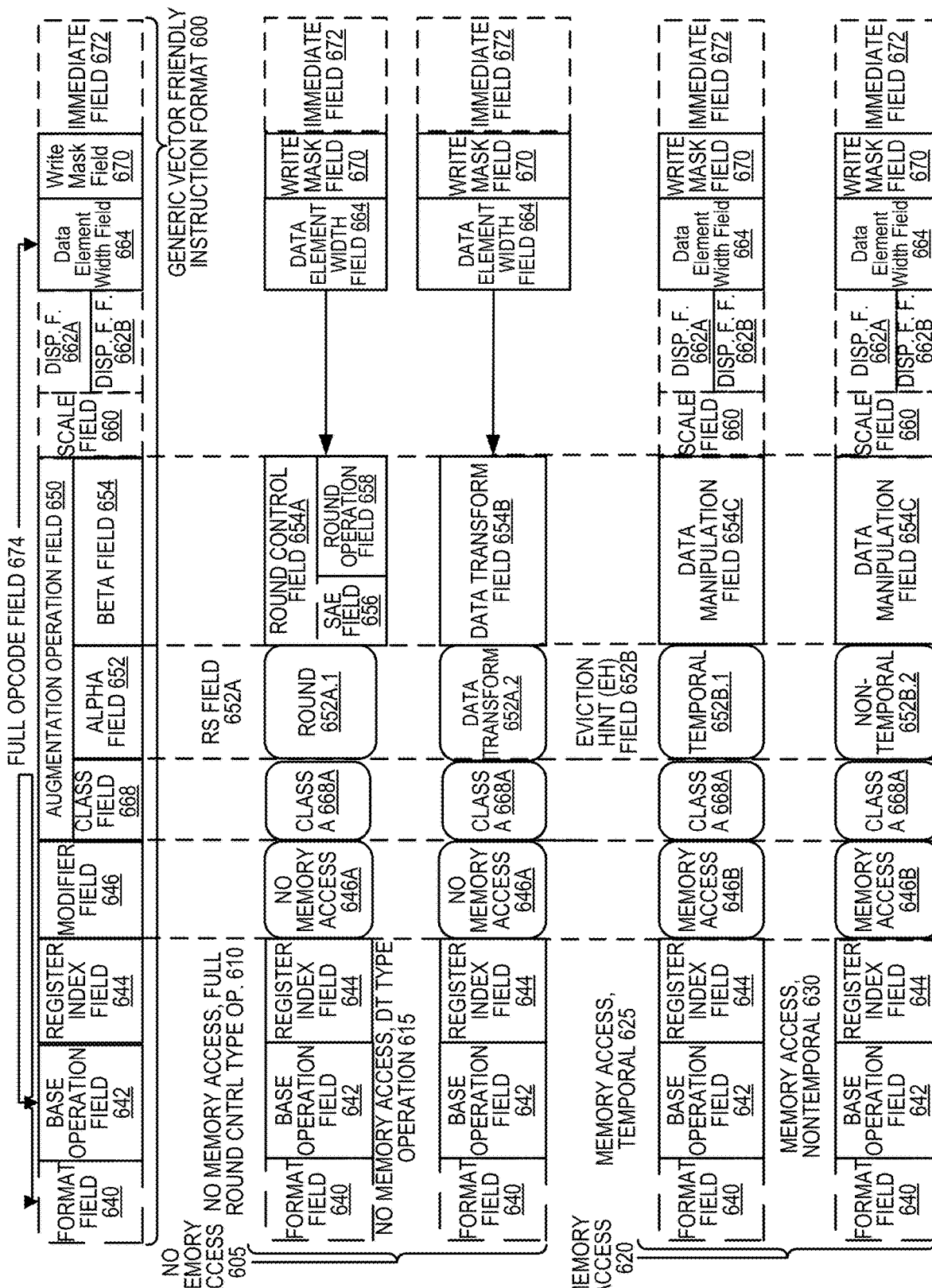
FIGS. 6A-6B are block diagrams illustrating a generic vector friendly instruction format and instruction templates thereof according to some embodiments of the invention.
Figure 6B:
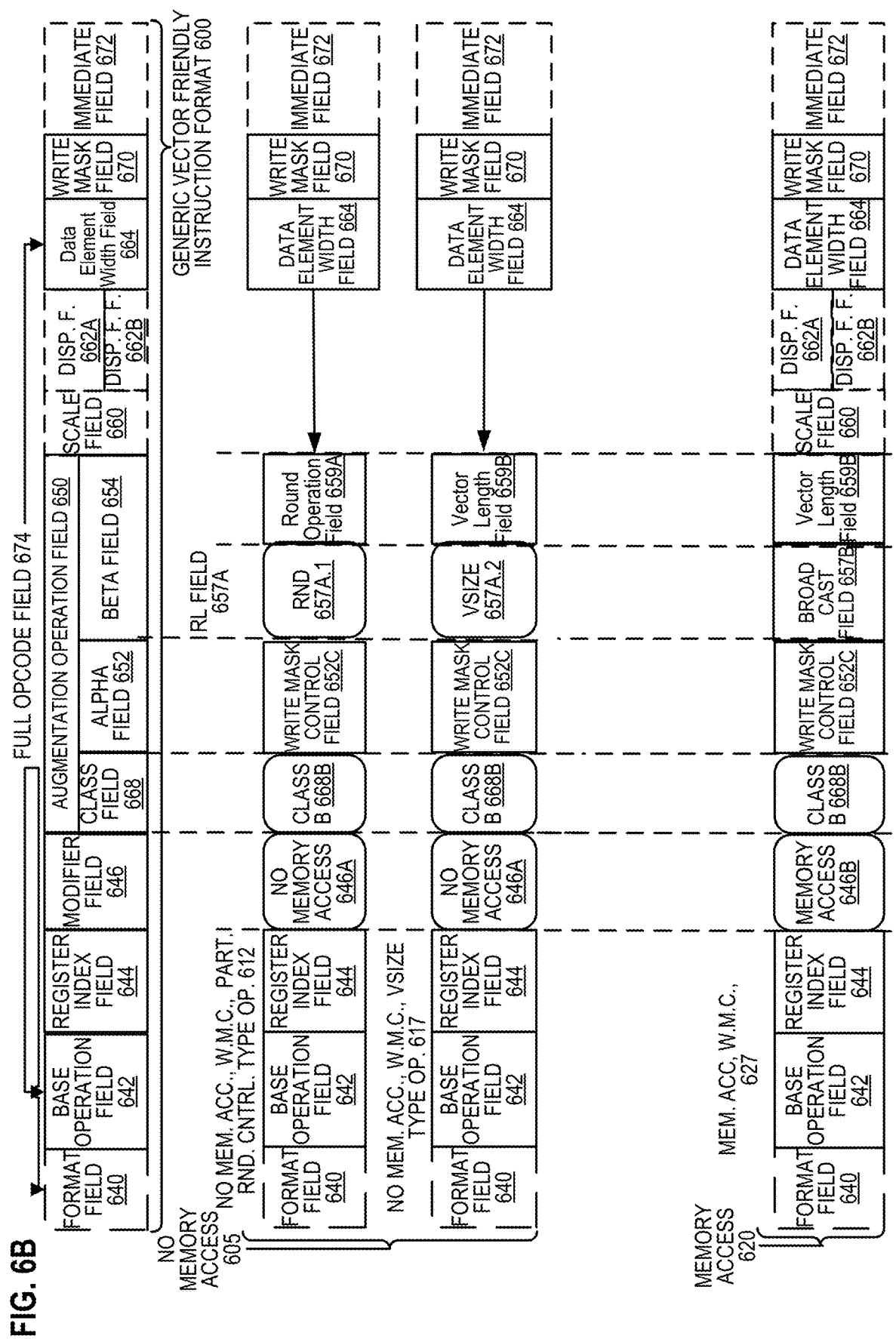

FIGS. 6A-6B are block diagrams illustrating a generic vector friendly instruction format and instruction templates thereof according to some embodiments of the invention. FIG. 6A is a block diagram illustrating a generic vector friendly instruction format and class A instruction templates thereof according to some embodiments of the invention; while FIG. 6B is a block diagram illustrating the generic vector friendly instruction format and class B instruction templates thereof according to some embodiments of the invention. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In some embodiments, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*index+base$).

Displacement Field 662A—its content is used as part of memory address generation (e.g., for address generation that uses $2^{scale}*index+base+displacement$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the invention are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that it is not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement factor field 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the invention the round control field 654A includes a suppress all floating-point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating-point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In some embodiments where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement factor field 662B.

Vector memory instructions perform vector loads from and vector stores to memory, with conversion support. As with regular vector instructions, vector memory instructions transfer data from/to memory in a data element-wise fashion, with the elements that are actually transferred being dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement factor field 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating-point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In some embodiments where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement factor field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general-purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7A is a block diagram illustrating an exemplary specific vector friendly instruction format according to some embodiments of the invention. FIG. 7A shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7A map are illustrated.

It should be understood that, although embodiments of the invention are described with reference to the specific vector friendly instruction format 700 in the context of the generic vector friendly instruction format 600 for illustrative purposes, the invention is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one-bit field in the specific vector friendly instruction format 700, the invention is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in some embodiments).

The second-fourth bytes (EVEX Bytes 1-3) include a number of bit fields providing specific capability.

REX field 705 (EVEX Byte 1, bits [7-5])—consists of an EVEX.R bit field (EVEX Byte 1, bit [7]—R), EVEX.X bit field (EVEX byte 1, bit [6]—X), and EVEX.B bit field (EVEX byte 1, bit [5]—B). The EVEX.R, EVEX.X, and EVEX.B bit fields provide the same functionality as the corresponding VEX bit fields, and are encoded using 1 s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 710A—this is the first part of the REX' field 710 and is the EVEX.R' bit field (EVEX Byte 1, bit [4]—R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1 s complement) form. Depending on the instruction, an extra different EVEX bit field is used to extend the specifier size to 32 registers.

EVEX.U 668 Class field (EVEX byte 2, bit [2]-U)—If EVEX.U=0, it indicates class A or EVEX.U0; if EVEX.U=1, it indicates class B or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 710B—this is the remainder of the REX' field 710 and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand or be treated as an opcode extension and not used to encode any instruction operand. The role of R/M field 746 may include the following: encoding the instruction operand that references a memory address or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128- and 127-byte offsets; in terms of 64-byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to some embodiments. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to some embodiments. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

FIG. 7D is a block diagram illustrating the fields of the specific vector friendly instruction format 700 that make up the augmentation operation field 650 according to some embodiments. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]-SSS) is interpreted as the round control field 654A. The round control field 654A includes a one-bit SAE field 656 and a two-bit round operation field 658. When the rs field 652A contains a 0 (data transform 652A.2), the beta field 654 (EVEX byte 3, bits [6:4]-SSS) is interpreted as a three-bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]-SSS) is interpreted as a three-bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]-SSS) is interpreted as the vector length field 659B (EVEX byte 3, bit [6-5]—$L_{1-0}$) and the broadcast field 657B (EVEX byte 3, bit [4]—B).

Exemplary Register Architecture

FIG. 8 is a block diagram of a register architecture 800 according to some embodiments. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
| --- | --- | --- | --- |
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 bytes, 32 bytes, or 16 bytes) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating-point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 845, on which is aliased the MMX packed integer flat register file 850—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 9A is a block diagram illustrating both an exemplary in-order pipeline and an exemplary register renaming, out-of-order issue/execution pipeline according to some embodiments of the invention. FIG. 9B is a block diagram illustrating both an exemplary embodiment of an in-order architecture core and an exemplary register renaming, out-of-order issue/execution architecture core to be included in a processor according to some embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front-end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front-end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front-end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general-purpose registers.

The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
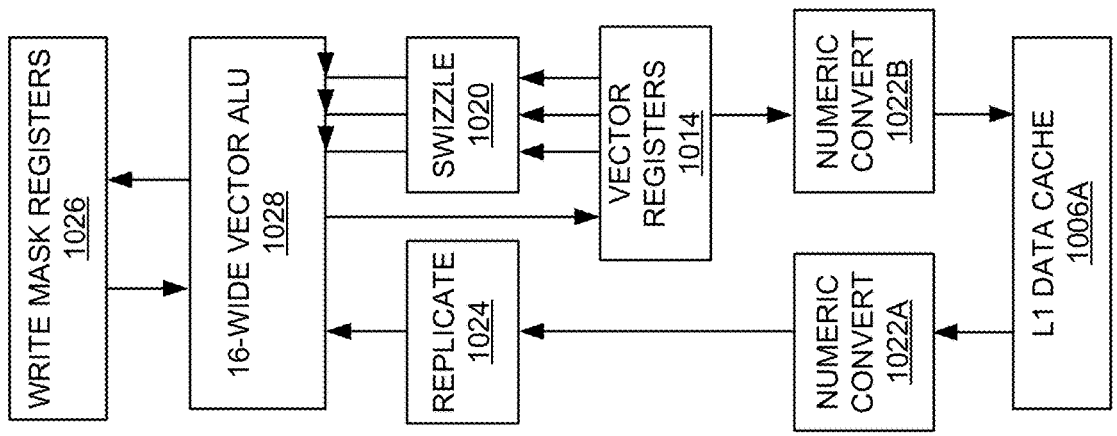
FIGS. 10A-B illustrate a block diagram of a more specific exemplary in-order core architecture, which core would be one of several logic blocks (including other cores of the same type and/or different types) in a chip.
Figure 10A:
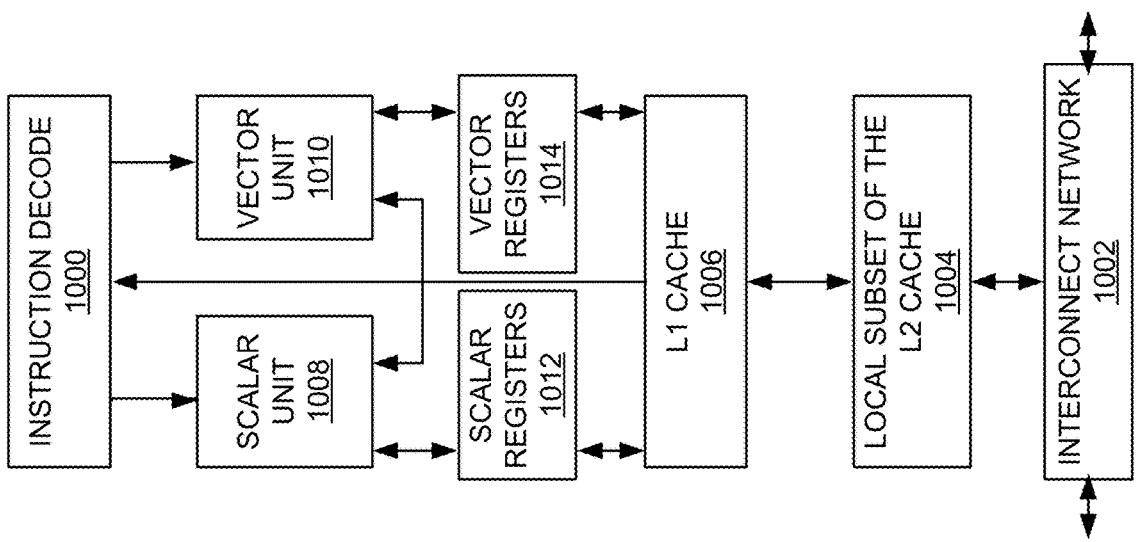

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to some embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to some embodiments of the invention. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
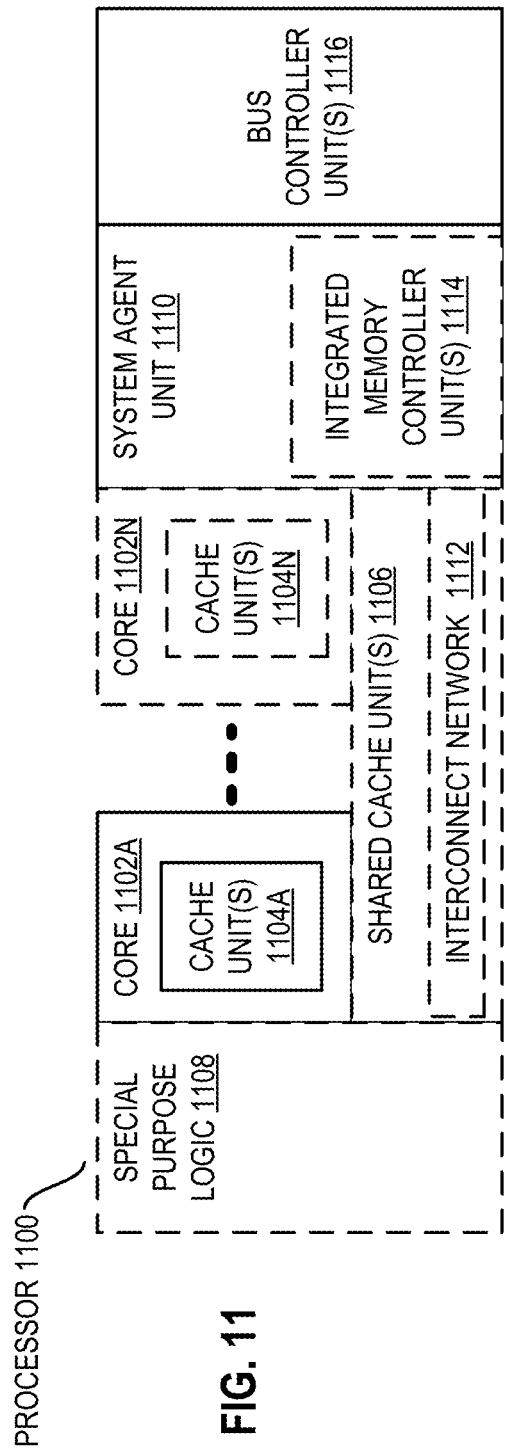
FIG. 11 is a block diagram of a processor that may have more than one core, may have an integrated memory controller, and may have integrated graphics according to some embodiments.

FIG. 11 is a block diagram of a processor 1100 that may have more than one core, may have an integrated memory controller, and may have integrated graphics according to some embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring-based interconnect unit 1112 interconnects the integrated graphics logic 1108 (integrated graphics logic 1108 is an example of and is also referred to herein as special purpose logic), the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
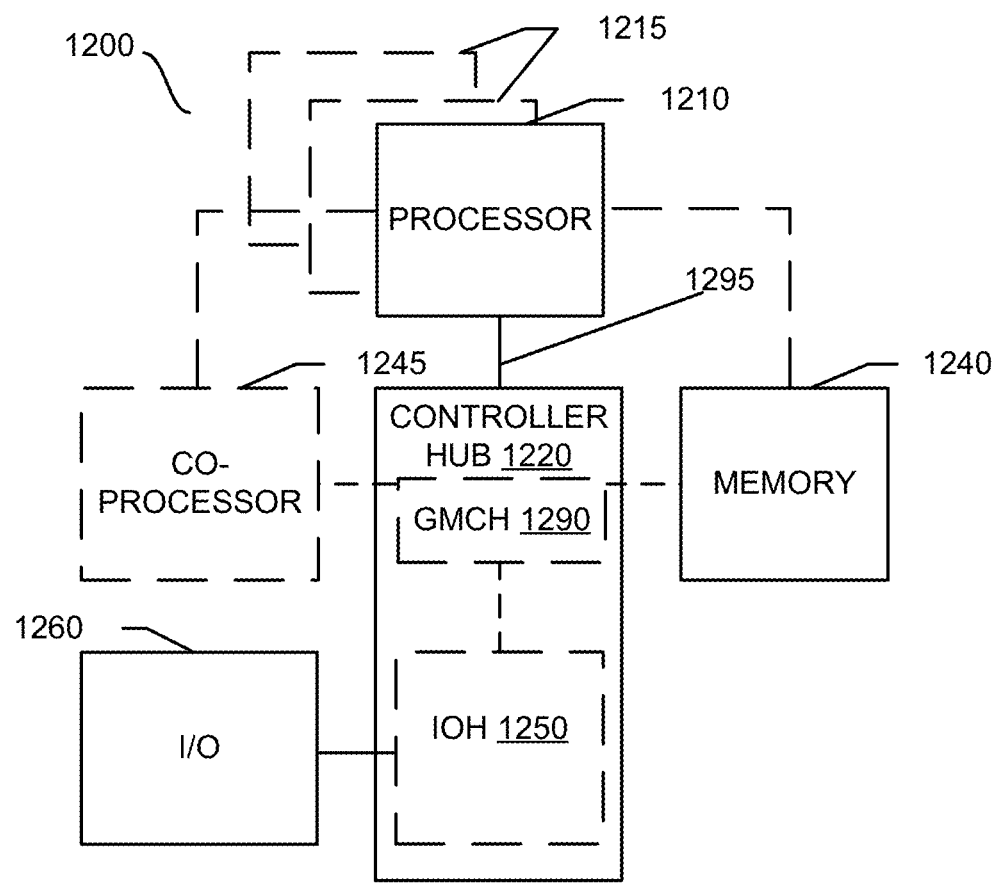
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random-access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
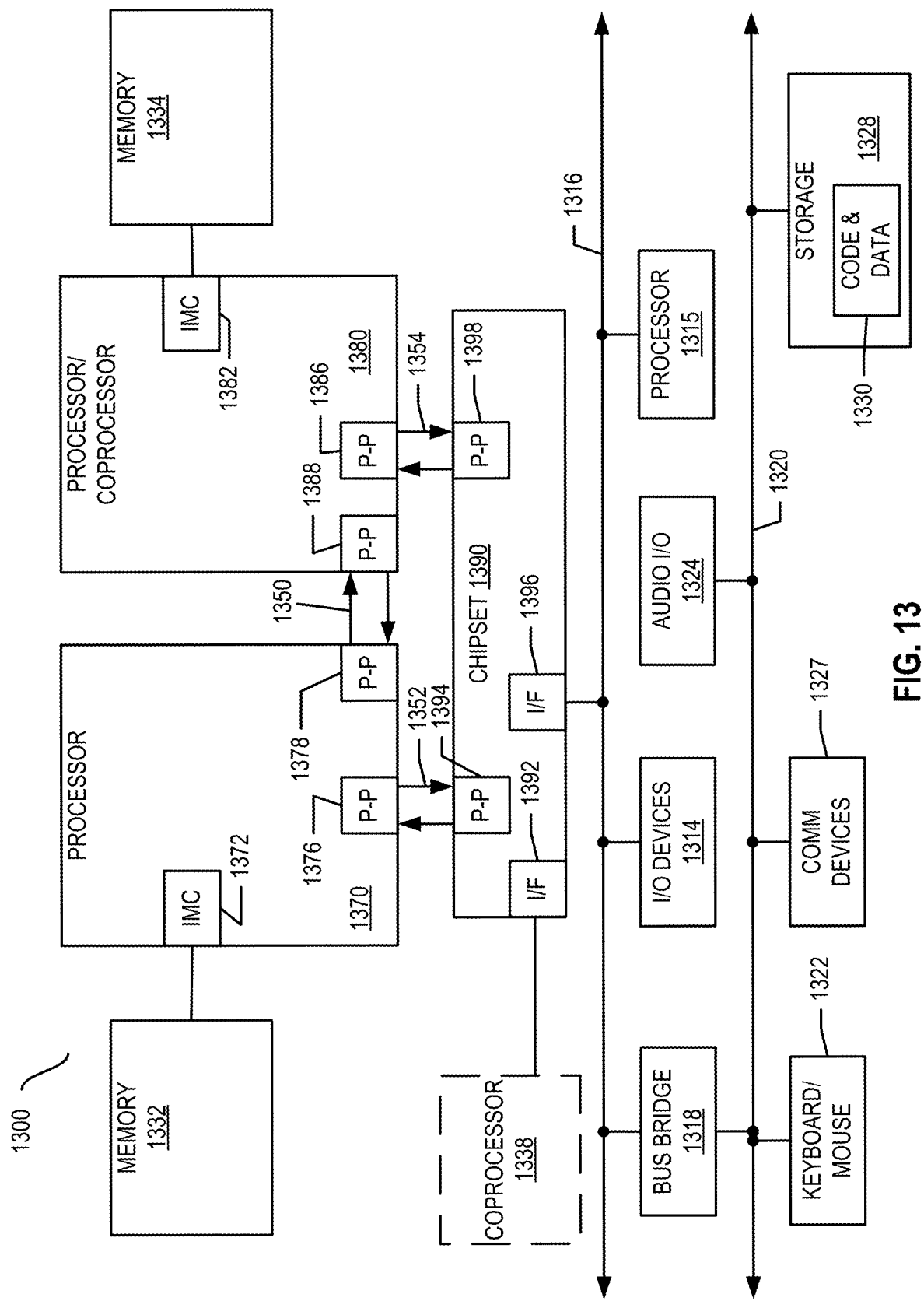

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In some embodiments, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
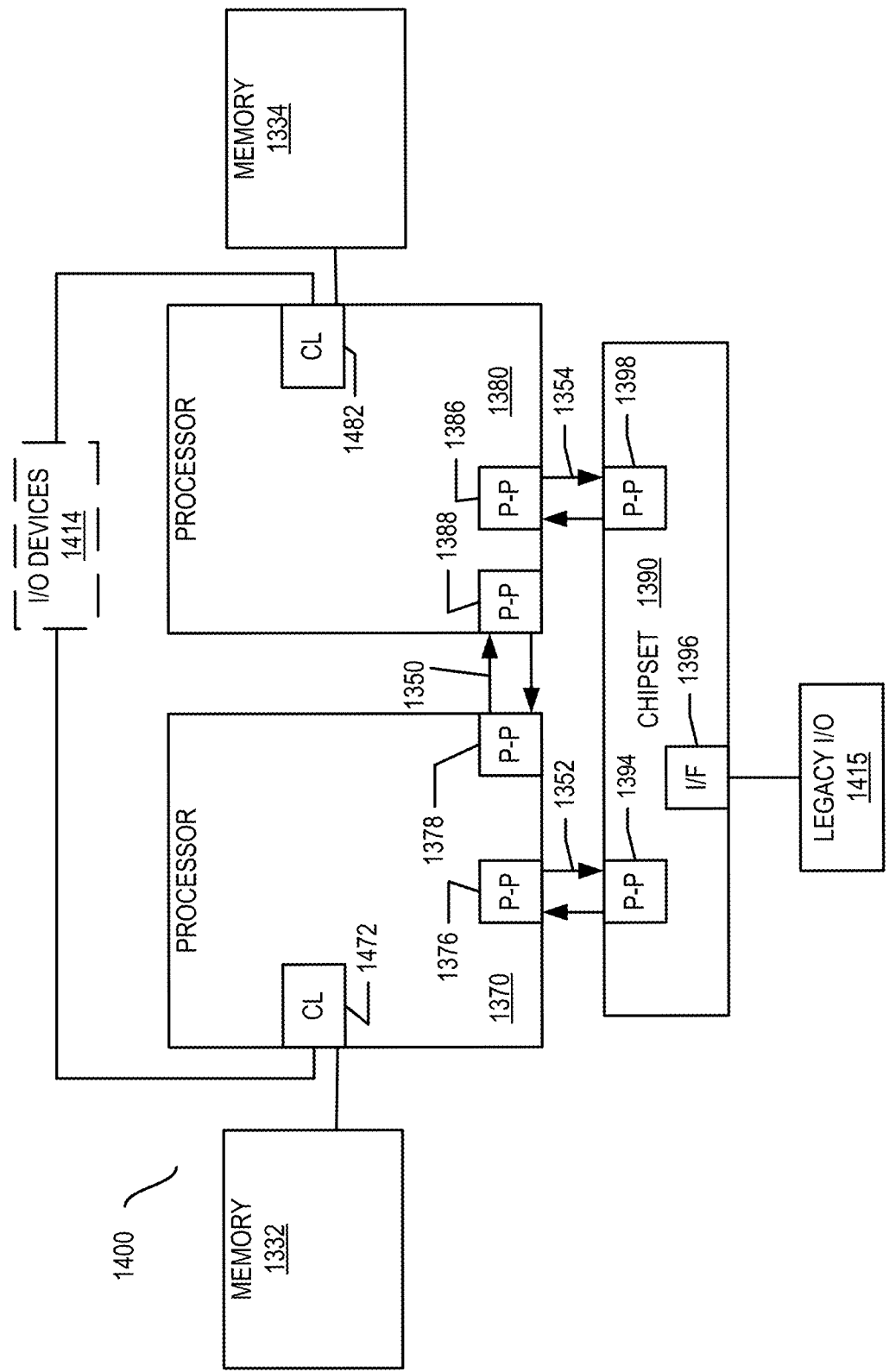

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 15:
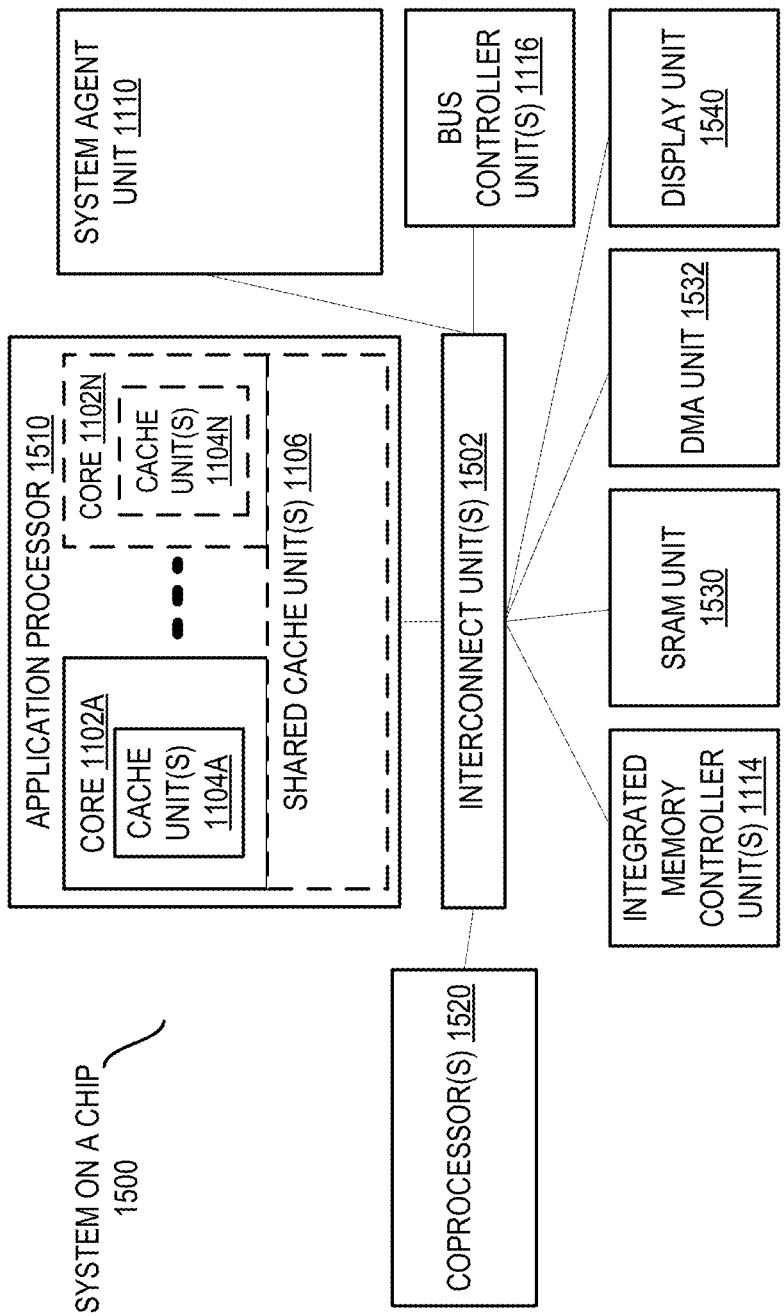

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N, which include cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; a static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
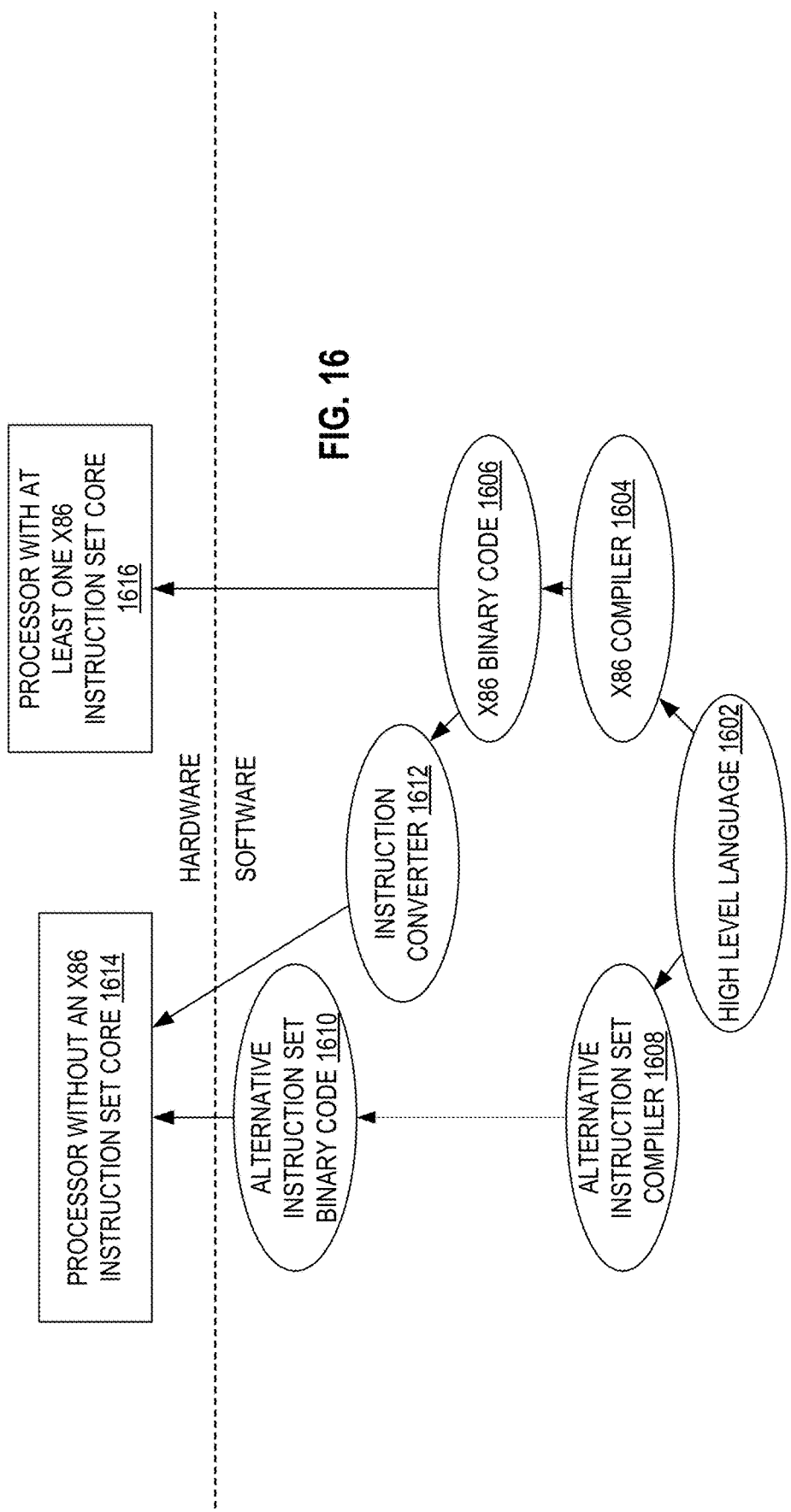
FIG. 16 is a block diagram contrasting the use of a software instruction converter to convert binary instructions in a source instruction set to binary instructions in a target instruction set according to some embodiments.

FIG. 16 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 16 shows a program in a high-level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

FURTHER EXAMPLES

Example 1 describes an exemplary processor comprising: fetch circuitry to fetch an instruction having fields to specify an opcode and locations of a first source vector comprising N single-precision elements, and a destination vector comprising at least N 16-bit floating-point elements, the opcode to indicate execution circuitry is to convert each of the elements of the specified source vector to 16-bit floating-point format, the conversion to include truncation and rounding, as necessary, and to store each converted element into a corresponding location of the specified destination vector; decode circuitry to decode the fetched instruction; and execution circuitry to respond to the decoded instruction as specified by the opcode.

Example 2 includes the substance of the exemplary processor of Example 1, wherein: the instruction is further to specify a location of a second source vector comprising N single-precision elements; the specified destination vector comprises 2 times N 16-bit floating-point elements, first and second halves of which correspond to the first and second source vectors, respectively; and the opcode to indicate the processor is to convert each of the elements of the specified first and second source vectors to 16-bit floating-point format, the conversion to include truncation and rounding, as necessary, and to store each converted element into a corresponding location of the specified destination vector.

Example 3 includes the substance of the exemplary processor of Example 1, wherein the locations of each of the specified source and destination vectors are either in registers or in memory.

Example 4 includes the substance of the exemplary processor of Example 1, wherein the 16-bit floating-point format comprises a sign bit, an 8-bit exponent, and a mantissa comprising 7 explicit bits and an eighth implicit bit.

Example 5 includes the substance of the exemplary processor of Example 1, wherein N is specified by the instruction and has a value of one of 4, 8, 16, and 32.

Example 6 includes the substance of the exemplary processor of Example 1, wherein when the execution circuitry performs rounding, it does so according to a Nearest Even rounding rule.

Example 7 includes the substance of the exemplary processor of Example 1, wherein the 16-bit floating-point format is either bfloat16 or binary16.

Example 8 includes the substance of the exemplary processor of Example 1, wherein the execution circuitry is to generate all N elements of the specified destination in parallel.

Example 9 describes an exemplary method executed by a processor, the method comprising: fetching, using fetch circuitry, an instruction having fields to specify an opcode and locations of a first source vector comprising N single-precision elements, and a destination vector comprising at least N 16-bit floating-point elements, the opcode to indicate execution circuitry is to convert each of the elements of the specified source vector to 16-bit floating-point format, the conversion to include truncation and rounding, as necessary, and to store each converted element into a corresponding location of the specified destination vector; decoding, using decode circuitry, the fetched instruction; and responding, using execution circuitry, to the decoded instruction as specified by the opcode.

Example 10 includes the substance of the exemplary method of Example 9, wherein: the instruction is further to specify a location of a second source vector comprising N single-precision elements; the specified destination vector comprises 2 times N 16-bit floating-point elements, first and second halves of which correspond to the first and second source vectors, respectively; and the opcode to indicate execution circuitry is to convert each of the elements of the specified first and second source vectors to 16-bit floating-point format, the conversion to include truncation and rounding, as necessary, and to store each converted element into a corresponding location of the specified destination vector.

Example 11 includes the substance of the exemplary method of Example 9, wherein the locations of each of the specified source and destination vectors are either in registers or in memory.

Example 12 includes the substance of the exemplary method of Example 9, wherein the 16-bit floating-point format comprises a sign bit, an 8-bit exponent, and a mantissa comprising 7 explicit bits and an eighth implicit bit.

Example 13 includes the substance of the exemplary method of Example 9, wherein N is specified by the instruction and has a value of one of 4, 8, 16, and 32.

Example 14 includes the substance of the exemplary method of Example 9, wherein when the execution circuitry performs rounding, it does so according to a rounding rule being to round to nearest even, as promulgated as IEEE 754.

Example 15 includes the substance of the exemplary method of Example 9, wherein the 16-bit floating-point format is either bfloat16 or binary16.

Example 16 includes the substance of the exemplary method of Example 9, wherein the execution circuitry is to generate all N elements of the specified destination in parallel.

Example 17 describes an exemplary non-transitory machine-readable medium containing instructions that, when executed by a processor, cause the processor to respond by: fetching, using fetch circuitry, an instruction having fields to specify an opcode and locations of a first source vector comprising N single-precision elements, and a destination vector comprising at least N 16-bit floating-point elements, the opcode to indicate execution circuitry is to convert each of the elements of the specified source vector to 16-bit floating-point format, the conversion to include truncation and rounding, as necessary, and to store each converted element into a corresponding location of the specified destination vector; decoding, using decode circuitry, the fetched instruction; and responding, using execution circuitry, to the decoded instruction as specified by the opcode.

Example 18 includes the substance of the exemplary non-transitory machine-readable medium of Example 17, wherein: the instruction is further to specify a location of a second source vector comprising N single-precision elements; the specified destination vector comprises 2 times N 16-bit floating-point elements, first and second halves of which correspond to the first and second source vectors, respectively; and the opcode to indicate execution circuitry is to convert each of the elements of the specified first and second source vectors to 16-bit floating-point format, the conversion to include truncation and rounding, as necessary, and to store each converted element into a corresponding location of the specified destination vector.

Example 19 includes the substance of the exemplary non-transitory machine-readable medium of Example 17, wherein the locations of each of the specified source and destination vectors are either in registers or in memory.

Example 20 includes the substance of the exemplary non-transitory machine-readable medium of Example 17, wherein when the execution circuitry performs rounding, it does so according to a Nearest Even rounding rule.

The invention claimed is:
1. A processor comprising:
a control register to specify a rounding mode;
fetch circuitry to fetch a format conversion instruction;
a decode unit to decode the format conversion instruction, the format conversion instruction having an opcode, a first field to specify a source vector register, a second field to specify a mask, and a third field to specify a destination vector register, the source vector register to store a source vector having a plurality of 32-bit single-precision floating point data elements, wherein the mask has a plurality of mask bits respectively corresponding to a plurality of data element positions of the destination vector register; and
execution circuitry coupled with the decode unit, the execution circuitry to perform operations corresponding to the format conversion instruction, including to:
for data element positions of the destination vector register for which the corresponding mask bit is one:
convert corresponding 32-bit single-precision floating point data elements of the source vector to corresponding 16-bit floating point data elements, according to the rounding mode specified by the control register, the 16-bit floating point data elements having a format, the format including a sign bit, an 8-bit exponent, seven explicit mantissa bits, and one implicit mantissa bit; and
store the 16-bit floating point data elements in the data element positions of the destination vector register; and for data element positions of the destination vector register for which the corresponding mask bit is zero, not change values in the data element positions, wherein the destination vector register has a plurality of data element positions that do not correspond to the plurality of mask bits.

2. The processor of claim 1, wherein the plurality of data element positions that do not correspond to the plurality of mask bits is a same number as a number of data element positions that do correspond to the plurality of mask bits.

3. The processor of claim 1, wherein the mask is a first register in a set of registers having a second register, the processor not supporting using the second register as a mask.

4. The processor of claim 1, wherein the source vector is a 128-bit source vector.

5. The processor of claim 1, wherein the source vector is a 256-bit source vector.

6. The processor of claim 1, wherein the source vector is a 512-bit source vector.

7. The processor of claim 1, wherein the source vector is a 1024-bit source vector.

8. The processor of claim 1, wherein the format conversion instruction allows the source vector to be any one of 128-bits and 512-bits.

9. The processor of claim 1, wherein the format is a bfloat16 format.

10. The processor of claim 1, wherein the processor is a general-purpose CPU core.

11. The processor of claim 1, wherein the processor is a reduced instruction set computing (RISC) processor.

12. The processor of claim 1, wherein the plurality of data element positions that do not correspond to the plurality of mask bits is a same number as a number of data element positions that do correspond to the plurality of mask bits, wherein the mask is a first register in a set of registers having a second register, the processor not supporting using the second register as a mask, and wherein the format conversion instruction allows the source vector to be any one of 128-bits and 512-bits.

13. The processor of claim 1, wherein the plurality of data element positions that do not correspond to the plurality of mask bits is a same number as a number of data element positions that do correspond to the plurality of mask bits, wherein the format is a bfloat16 format, wherein the processor is a general-purpose CPU core, and wherein the format conversion instruction allows the source vector to be any one of 128-bits and 512-bits.

14. A method comprising:
specifying a rounding mode in a control register;
fetching a format conversion instruction;
decoding the format conversion instruction, the format conversion instruction having an opcode, a first field specifying a source vector register, a second field specifying a mask, and a third field specifying a destination vector register, the source vector register storing a source vector having a plurality of 32-bit single-precision floating point data elements, wherein the mask has a plurality of mask bits respectively corresponding to a plurality of data element positions of the destination vector register; and
performing operations corresponding to the format conversion instruction, including:
for data element positions of the destination vector register for which the corresponding mask bit is one:
converting corresponding 32-bit single-precision floating point data elements of the source vector to corresponding 16-bit floating point data elements, according to the rounding mode specified by the control register, the 16-bit floating point data elements having a format, the format including a sign bit, an 8-bit exponent, seven explicit mantissa bits, and one implicit mantissa bit; and
storing the 16-bit floating point data elements in the data element positions of the destination vector register; and
for data element positions of the destination vector register for which the corresponding mask bit is zero, not changing values in the data element positions, wherein the destination vector register has a plurality of data element positions that do not correspond to the plurality of mask bits.

15. The method of claim 14, wherein the plurality of data element positions that do not correspond to the plurality of mask bits is a same number as a number of data element positions that do correspond to the plurality of mask bits, wherein the mask is a first register in a set of registers having a second register, the second register not able to be used as a mask, and wherein the format conversion instruction allows the source vector to be any one of 128-bits and 512-bits.

16. The method of claim 14, wherein the format is a bfloat16 format, wherein the plurality of data element positions that do not correspond to the plurality of mask bits is a same number as a number of data element positions that do correspond to the plurality of mask bits, and wherein the format conversion instruction allows the source vector to be any one of 128-bits and 512-bits.

17. A processor comprising:
a decode unit to decode a format conversion instruction, the format conversion instruction to indicate a location of a first source operand, a location of a second source operand, a destination register, a writemask register, and a type of masking, the first source operand to include a first plurality of 32-bit single-precision floating point data elements, the second source operand to include a second plurality of 32-bit single-precision floating point data elements, the writemask register to store a plurality of mask bits each corresponding to a data element position in the destination register, the type of masking to be either zeroing masking or merging masking; and
execution circuitry coupled to the decode unit, the execution circuitry to perform operations corresponding to the format conversion instruction, including to:
for each of the first plurality of 32-bit single-precision floating point data elements that is of a first type, convert the 32-bit single-precision floating point data element to a 16-bit floating point data element using round to nearest even rounding behavior and store a result data element in a corresponding data element position in a first half of a result in the destination register if the mask bit corresponding to the data element position in the plurality of mask bits is set, and otherwise include a masked data element in the data element position, and
for each of the second plurality of 32-bit single-precision floating point data elements that is of the first type, convert the 32-bit single-precision floating point data element to a 16-bit floating point data element using round to nearest even rounding behavior and store a result data element in a corresponding data element position in a second half of the result in the destination register if the mask bit corresponding to the data element position in the plurality of mask bits is set, and otherwise include a masked data element in the data element position, the result data elements stored in the destination register to have a format that includes one sign bit, eight exponent bits, and seven explicit mantissa bits, the masked data element to be a zero value if the type of masking is zeroing masking and to be a value stored in the data element position prior to performing the operations corresponding to the format conversion instruction if the type of masking is merging masking, wherein the first type is a normal number.

18. The processor of claim 17, wherein the format is a BF16 format, wherein the first half of the result is a lower order half of the result and the second half of the result is a higher order half of the result.

19. The processor of claim 17, wherein any denormal data elements in the first plurality of 32-bit single-precision floating point data elements and the second plurality of 32-bit single-precision floating point data elements are treated as zero values, and wherein the round to nearest even rounding behavior is used irrespective of a rounding behavior specified by a control register.

20. The processor of claim 17, wherein the location of the first source operand is a register location or a memory location, and wherein the first type excludes zero, denormal, infinity, and NaN, and wherein the first source operand and the second source operand consist of a same number of bits, wherein the same number of bits is 128, 256, or 512 bits.

* * * * *